United States Patent
Koorapati et al.

(10) Patent No.: US 12,411,518 B2
(45) Date of Patent: Sep. 9, 2025

(54) THROTTLE CONTROL CIRCUITS FOR THROTTLING ACTIVITY IN PROCESSING SEGMENT CIRCUITS IN AN INTEGRATED CIRCUIT (IC) CHIP AND RELATED METHODS

(71) Applicant: QUALCOMM Incorporated, San Diego, CA (US)

(72) Inventors: Sagar Koorapati, Austin, TX (US); Alon Naveh, Corte Madera, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 18/339,478

(22) Filed: Jun. 22, 2023

(65) Prior Publication Data
US 2024/0427368 A1    Dec. 26, 2024

(51) Int. Cl.
*G06F 1/08* (2006.01)
*G06F 1/3228* (2019.01)
*G06F 1/324* (2019.01)

(52) U.S. Cl.
CPC .............. *G06F 1/08* (2013.01); *G06F 1/3228* (2013.01); *G06F 1/324* (2013.01)

(58) Field of Classification Search
CPC ........... G06F 1/08; G06F 1/324; G06F 1/3228
USPC .................................................. 713/320, 324
See application file for complete search history.

(56) References Cited

U.S. PATENT DOCUMENTS

| | | | |
|---|---|---|---|
| 7,966,511 B2 * | 6/2011 | Naveh ...................... | G06F 1/324 713/100 |
| 11,048,323 B2 * | 6/2021 | Ho .......................... | G06F 1/329 |
| 11,733,757 B2 * | 8/2023 | Naveh .................... | G06F 1/3243 713/300 |
| 12,228,988 B2 * | 2/2025 | Koorapati ............. | G06F 1/3203 |
| 2015/0309551 A1 | 10/2015 | Yeager | |
| 2021/0096635 A1 | 4/2021 | Kalyanam et al. | |

(Continued)

OTHER PUBLICATIONS

"Static and Dynamic Frequency Scaling on Multicore CPUs"—by Wenlei Bao, Changwan Hong, Sudheer Chunduri, Sriram Krishnamoorthy, Louis-Noel Pouchet, Fabrice Rastello, and P. Sadayappan; 26 Pages, dated Dec. 2016 (Year: 2016).*

(Continued)

*Primary Examiner* — Brian T Misiura
(74) *Attorney, Agent, or Firm* — W&T

(57) ABSTRACT

A throttle control circuit receives a throttle control signal for controlling power consumption in a plurality of processing segment circuits. The throttle control signal has a throttle control value based on throttle requests from monitoring circuits that have detected power-related events or conditions and correspond to a requested change in activity in the plurality of processing segment circuits. The throttle control circuit receives the throttle control signal in a plurality of throttle administration circuits that each generates a throttle select signal to select an activity control signal for a corresponding processing segment circuit. In each of a first number (N) of consecutive cycles of a clock signal, the activity control signal disables state changes in the corresponding processing segment circuit for a second number (M) of cycles among the first number (N) of consecutive cycles to reduce power consumption in the processing segment circuits.

28 Claims, 19 Drawing Sheets

(56) References Cited

U.S. PATENT DOCUMENTS

2021/0405729 A1* 12/2021 Abou-Alfotouh .... G06F 1/3206

OTHER PUBLICATIONS

"Low Power Design for a Multi-core Multi-thread Microprocessor"—by Wang Yong-Wen, Zheng Qian-Bing, Dou Qiang, and Zhang Min-Xuan; 6 Pages, Dated 2010 (Year: 2010).*
International Search Report and Written Opinion for International Patent Application No. PCT/US2024/028309, mailed Sep. 2, 2024, 14 pages.

* cited by examiner

THROTTLE CONTROL CIRCUITS FOR THROTTLING ACTIVITY IN PROCESSING SEGMENT CIRCUITS IN AN INTEGRATED CIRCUIT (IC) CHIP AND RELATED METHODS

BACKGROUND

I. Field of the Disclosure

The field of the disclosure relates to processor-based systems (e.g., central processing unit (CPU)-based systems, graphic processing unit (GPU)-based systems), or neural network processing unit (NPU)-based systems, and more particularly, to power distribution management of circuits in the processor-based systems.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. Other examples of PUs may include neural network processing units or neural processing units (NPUs). CPUs are configured to execute software instructions that cause a processor to fetch data from a location in a memory and to perform one or more processor operations using the fetched data.

PUs are included in a computer system that includes other supporting processing devices (circuits) involved with or accessed as part of performing computing operations in the computer system. Examples of these other supporting processing devices include memory, input/output (I/O) devices, secondary storage, modems, video processors, and related interface circuits. The PUs and supporting processing devices in a computer system are referred to collectively as processing devices. Processing devices of a processor-based system can be provided in separate integrated circuits (ICs) in separate IC chips or may be aggregated in a larger IC, like a system-on-a-chip (SoC) IC, wherein some or all of these processing devices are integrated into the same IC chip. For example, an SoC IC chip may include a PU that includes a plurality of processor cores and supporting processing devices, such as a memory system that includes cache memory and memory controllers for controlling access to external memory, I/O interfaces, power management systems, etc. An SoC may be particularly advantageous for applications in which a limited area is available for the computer system (e.g., a mobile computing device such as a cellular device). To manage power distributed to the processing devices, the SoC may also include a power management system that includes one or more power rails in the SoC that supply power to its components. A separate power management integrated circuit (PMIC) that can be off-chip or on-chip with the SoC can independently control power supplied to the power rails. The SoC may be designed with a plurality of different power rails that are distributed within the SoC to provide power to various clusters of the processing devices for their operation. For example, all the processor cores in the SoC may be coupled to a common power rail for power, whereas supporting processing devices may be powered from separate power rails in the SoC, depending on the design of the SoC.

SUMMARY OF THE DISCLOSURE

Aspects disclosed herein include throttle control circuits for throttling activity of processing segment circuits in an integrated circuit (IC) chip. Related methods of throttle control in an IC chip are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), a graphics processing unit (GPU), or a neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., by controlling the voltage level) distributed at one or more power rails in the IC chip that provide power to the PUs and the integrated supporting processing devices. For example, the hierarchical power management system can be configured to provide additional power to certain power rails to supply power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note, as used herein, throttle can mean to take an action that will decrease or increase a parameter that affects power and thus results in a respective decrease or increase in power consumption.

The hierarchical power management system is configured to throttle performance of the processing devices in the processor-based system because the level of processing activity in the processing devices in a SoC can vary based on workload conditions. Some power rails in the SoC may experience heightened current demand. It is desired that this current demand does not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to operate properly and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system may include local area management (LAM) circuits distributed in the IC chip that are each associated with and provided to monitor one or more processing circuits (also referred to as "processing devices") in the IC chip. The LAM circuits may be configured to generate power events associated with monitored processing circuits in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system. The PEL circuit may be configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state current demand (I) and current transients (di/dt), and thus its power consumption. Because the IC chip may be larger in terms of die area due to the integration of the PUs and integrated supporting processing devices, there can be a significant delay between when the PEL circuit receives a power event regarding power consumption of a monitored processing device and the PEL circuit throttling power in the IC chip to throttle power consumption in response. This delay can, for example, cause devices in the IC chip to temporarily continue to consume excess power that can cause thermal and/or power issues (e.g., di/dt issues, voltage droop, heat generation) or permanent damage before the power management circuit has time to react. Thus, in response to the power events, current demand and transients, and other monitoring and control circuits associated with each LAM circuit, localized control may also be asserted on the processing circuits to improve response time and avoid performance issues.

In this regard, the processor-based system includes, additionally or alternatively, a throttle control circuit that may be associated with a LAM circuit and receive a throttle control signal for controlling power consumption in a plurality of processing segment circuits which may be associated with the LAM circuit. The throttle control signal has a throttle control value that may be based on throttle requests provided from monitoring circuits that have detected power-related events or conditions associated with the LAM circuit and correspond to a requested change in activity in the plurality of processing segment circuits. In an exemplary aspect, the throttle control circuit receives the throttle control signal in a plurality of throttle administration circuits. Each throttle administration circuit generates a throttle select signal to select an activity control signal for a corresponding processing segment circuit. A throttle sequence selection circuit receives the respective throttle select signals and provides, to the plurality of processing segment circuits, a selected activity control signal to reduce state changes in the processing segment circuit according to the throttle control value. In this regard, in each of a first number (N) of consecutive cycles of a clock signal, the activity control signal disables state changes in the corresponding processing segment circuit for a second number (M) of cycles among the first number (N) of consecutive cycles to reduce power consumption in the processing segment circuits.

In this regard, in one exemplary aspect, an integrated circuit (IC) chip comprising a processor-based system. The processor-based system comprises a plurality of processing segment circuits, each configured to operate in response to a clock signal; and a throttle control circuit. The throttle control circuit comprises a plurality of throttle administration circuits, each configured to receive a throttle control signal and generate a throttle select signal based on the throttle control signal, corresponding one of the first plurality of processing segment circuits; and a throttle sequence selection circuit configured to provide, to each of the first plurality of processing segment circuits, an activity control signal configured to throttle activity in the processing segment circuit in a first number (M) of cycles among a second number (N) of consecutive cycles of the clock signal based on a corresponding throttle select signal.

In another exemplary aspect, a method of controlling activity in an integrated circuit (IC) chip comprising a processor-based system is disclosed. The method comprises operating each of a plurality of processing segment circuits in response to a clock signal; receiving, in each of a plurality of throttle administration circuits, a throttle control signal; and generating a throttle select signal corresponding one of the first plurality of processing segment circuits. The method further comprises providing an activity control signal, based on the corresponding throttle select signal, to each of the first plurality of processing segment circuits in each cycle of a first number (N) of consecutive cycles of the clock signal, the activity control signal configured to disable operation in the processing segment circuit in a second number (M) of cycles among the first number (N) of consecutive cycles.

In another exemplary aspect, a throttle control circuit is disclosed. The throttle control circuit comprises a plurality of throttle administration circuits, each configured to receive a throttle control signal and generate a throttle select signal based on the throttle control signal, corresponding one of a first plurality of processing segment circuits. The throttle control circuit also comprises a throttle sequence selection circuit configured to provide, to each of the first plurality of processing segment circuits in each cycle of a first number (N) of consecutive cycles of the clock signal, an activity control signal configured to disable state changes in the processing segment circuit in a second number (M) of cycles among the first number of consecutive cycles based on the corresponding throttle select signal.

DETAILED DESCRIPTION

Figure 1:
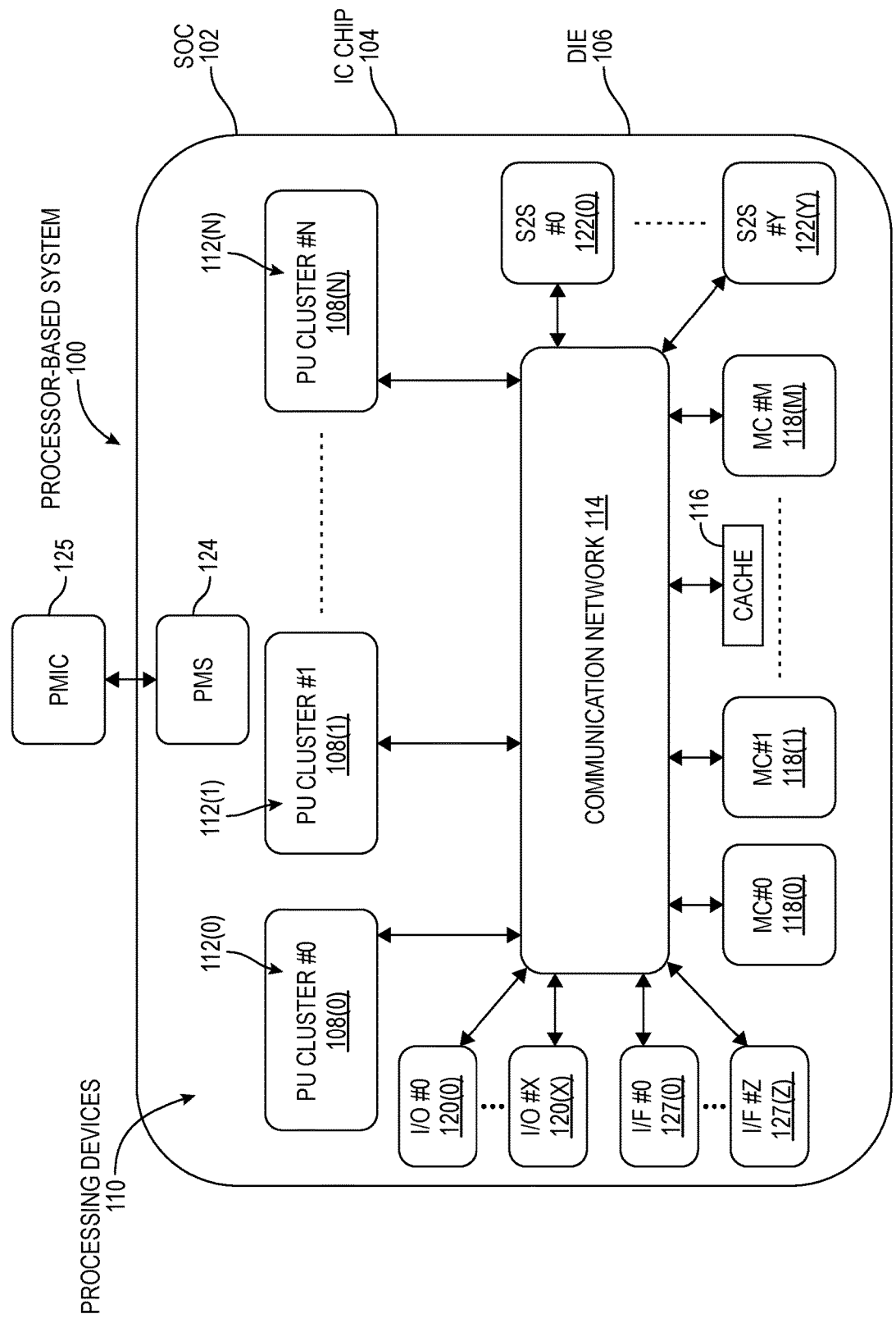
FIG. 1 is a schematic diagram of an exemplary processor-based system in the form of an exemplary system-on-a-chip (SoC) in an integrated circuit (IC) chip.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein may optionally include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU), or neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller mobile devices (e.g., a cellular phone, a laptop computer), as well as enterprise systems such as server chips in computer servers. The IC chip may also include a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current-demanding devices to achieve higher performance while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note, as used herein, throttle can mean to take an action that will decrease or increase a parameter that affects power and thus results in a respective decrease or increase in power consumption.

In exemplary aspects, the hierarchical power management system may include local area management (LAM) circuits distributed in the IC chip that are each associated with one or more processing devices in the IC chip. The LAM circuits may be configured to generate power events associated with its monitored processing devices in the IC chip that represent power consumption associated with the monitored processing devices in the IC chip. The power events can be reported from local areas in the IC chip, where power estimations for particular monitored processing devices are performed, to a centralized power estimation and limit (PEL) circuit in the hierarchical power management system.

The PEL circuit is configured to estimate and control (i.e., throttle) power in the processor-based system in the IC chip to achieve a desired performance within an overall power budget for the IC chip. The PEL circuit may determine how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip may affect its steady state current demand and transient current demands (e.g., changes in current flow rate referred to as "di/dt") and thus affect power consumption. Because the IC chip may be larger in terms of die area due to the integration of the processing units and integrated supporting processing devices, there can be a significant delay between when PEL circuit receives a power event regarding the consumption of a monitored processing device and the PEL circuit throttling power in the IC chip to throttle power consumption in response. This delay can, for example, cause devices in the IC chip to temporarily continue to consume excess power that can cause performance issues (e.g., di/dt issues, voltage droop, heat generation) before the power management circuit has time to react.

In this regard, the processor-based system includes, additionally or alternatively, a throttle control circuit that may be associated with a LAM circuit and receive a throttle control signal for controlling power consumption in a plurality of processing segment circuits which may be associated with the LAM circuit. The throttle control signal has a throttle control value that may be based on throttle requests provided from monitoring circuits that have detected power-related events or conditions associated with the LAM circuit and correspond to a requested change in activity in the plurality of processing segment circuits. In an exemplary aspect, the throttle control circuit receives the throttle control signal in a plurality of throttle administration circuits. Each throttle administration circuit generates a throttle select signal to select an activity control signal for a corresponding processing segment circuit. A throttle sequence selection circuit receives the respective throttle select signals and provides, to the plurality of processing segment circuits, a selected activity control signal to reduce state changes in the processing segment circuit according to the throttle control value. In this regard, in each of a first number (N) of consecutive cycles of a clock signal CLK, the activity control signal disables state changes in the corresponding processing segment circuit for a second number (M) of cycles among the first number (N) of consecutive cycles to reduce power consumption in the processing segment circuits.

In this regard, FIG. 1 is a schematic diagram of an exemplary processor-based system 100 in the form of an exemplary system-on-a-chip (SoC) 102 in an integrated circuit (IC) chip 104. Optionally, a hierarchical power management system can be provided. The SoC 102 may be employed in smaller mobile devices (e.g., a cellular phone, a laptop computer), as well as enterprise systems such as server chips in computer servers. The processor-based system 100 is first described with regard to FIG. 1 before exemplary hierarchical power management systems that can be provided in the processor-based system 100 to estimate and throttle power consumption in the IC chip 104 are described starting at FIG. 2 below.

With reference to FIG. 1, the processor-based system 100 is provided in a single semiconductor die 106 and integrated into a single IC chip 104. The processor-based system 100 includes a plurality of processing unit (PU) clusters 108(0)- 108(N) that are examples of processing devices 110 in the processor-based system 100. Each of the PU clusters 108 (0)-108(N) can include one or more processor cores 112(0)- 112(N), which are each configured to execute instructions (e.g., software, firmware) to carry out tasks as is known for processors. For example, the PU clusters 108(0)-108(N) may be central processing unit (CPU) clusters wherein one or more of the processor cores 112(0)-112(N) includes CPUs and/or graphics processing unit (GPU) clusters, wherein one or more of the processor cores 112(0)-112(N) includes GPUs. The processor-based system 100 includes an internal communication network 114 that facilitates providing communication paths between the PU clusters 108(0)-108(N) and other supporting processing devices that are also considered to be processing devices to carry out desired processing requests and related processing tasks. The PU clusters 108(0)-108(N) are communicatively coupled to the internal communication network 114. The internal communication network 114 can be a coherent communication bus that provides a fabric in the processor-based system 100. The internal communication network 114 can be a network fabric that typically consists of network nodes and their communication lines, a network of wires, and/or communication channels that provide communication paths that provide reliable communication between different PU clusters 108 (0)-108(N) and the supporting processing devices 110. Network nodes are the circuits, such as interconnected switches and routers, that provide a reliable network fabric that provides and receives data on the communication paths between different PU clusters 108(0)-108(N) and the supporting processing devices 110. The fabric provided by the internal communication network 114 also includes a network of wires or communication channels that allow different processing devices in the processor-based system 100 to communicate and exchange data with each other at high speeds.

For example, as shown in FIG. 1, the processor-based system 100 also includes internal cache memory 116 and memory controllers (MCs) 118(0)-118(M) as other types of processing devices 110 that provide access to memory. The cache memory 116 shown in FIG. 1 is a shared cache memory that is communicatively coupled to the internal communication network 114 and can be accessed by the PU clusters 108(0)-108(N) through the internal communication network 114. The processor-based system 100 may also include private cache memory and/or private shared cache memory that is integrated or privately accessible by one or more of the respective PU clusters 108(0)-108(N) without having to access such through the internal communications network 114. The memory controllers 118(0)-118(M) are communicatively coupled to the internal communication network 114 in the IC chip 104. The memory controllers 118(0)-118(M) provide the PU clusters 108(0)-108(N) access to memory for storing and retrieving data to carry out processing tasks. For example, the memory controllers 118 (0)-118(M) may be coupled to external memory from the IC chip 104 or internal memory integrated into the IC chip 104.

Also, as shown in FIG. 1, the processor-based system 100 in this example also includes I/O interface circuits 120(0)- 120(X) as other examples of processing devices 110 that are also communicatively coupled to the internal communication network 114. The I/O interface circuits 120(0)-120(X) provide access to I/O devices, which may be internal and integrated into the IC chip 104 or external to the IC chip 104. For example, the I/O interface circuits 120(0)-120(X) may be a peripheral component interconnect (PCI) interface circuits that are used for connecting I/O hardware devices to a processor-based system, like the processor-based system 100 in FIG. 1, to allow high-speed data to be transferred between devices and the PU clusters 108(0)-108(N) in the processor-based system 100.

Also, as shown in FIG. 1, the processor-based system 100 in this example also includes socket-to-socket (S2S) interface circuits 122(0)-122(Y) as other examples of processing devices 110 that are also communicatively coupled to the internal communication network 114. The S2S interface circuits 122(0)-122(Y) allow the processor-based system 100 to be coupled to another separate processor-based system (which may be like the processor-based system 100 in FIG. 1) in a socket-to-socket connection. For example, the processor-based system 100 shown in FIG. 1 may be a first CPU motherboard system that can be communicatively coupled to another processor-based system for communication through the internal communication network 114 and a coupled S2S interface circuit 122(0)-122(Y).

Also, as shown in FIG. 1, the processor-based system 100 in this example also includes other interface (I/F) circuits 127(0)-127(Z) as other examples of processing devices 110 that are also communicatively coupled to the internal communication network 114. The interface circuits 127(0)-127 (Z) can provide an additional external communications interface to the SoC 102 and can be configured to provide a communication interface according to the desired standard or protocol. For example, the interface circuits 127(0)-127 (Z) could be PCIe interface circuits that are configured to support PCIe communications with the SoC 102.

Thus, in the processor-based system 100 in FIG. 1, the internal communication network 114 enables different processing devices such as PU clusters 108(0)-108(N) and their processor cores 112(0)-112(N), caches, the memory controllers 118(0)-118(M), the I/O interface circuits 120(0)-120(X), and/or the S2S interface circuits 122(0)-122(Y) to work together efficiently. The fabric provided by the internal communication network 114 is designed to provide high bandwidth, low latency, and efficient routing of data between different processing devices of the processor-based system 100.

Also, as shown in FIG. 1 and as described in more detail below, the processor-based system 100 may also include a hierarchical power management system 124. In this example, the hierarchical power management system 124 is integrated into the same IC chip 104 and in the same die 106 that includes the PU clusters 108(0)-108(N) and the internal communication network 114. The hierarchical power management system 124 may be configured to control the power consumption of the processor-based system 100 by controlling the power consumption of some or all of the processing devices 110 in the IC chip 104. The hierarchical power management system 124 may be configured to manage power consumption to achieve a desired performance within an overall power budget for the IC chip 104. For example, the processor-based system 100 may have an overall power budget that is based on the ability of the IC chip 104 to dissipate heat generated by the operation of the processor-based system 100. The processor-based system 100 may also have an overall power budget that is based on a current limit of power rails in the IC chip 104. The power budget of the processor-based system 100 may also be based on the power supply limits of a power supply that is powering the processor-based system 100. Thus, the hierarchical power management system 124 can be configured to control power consumption by controlling the power level (e.g., voltage level) distributed at one or more of the power rails in the IC chip 104 that provide power to the processing devices 110 or by controlling operating frequency. For example, the hierarchical power management system 124 can be configured to cause additional power to be supplied to certain power rails, thus supplying power to higher current demanding devices to achieve higher performance while providing less power to other power rails to keep the overall power within power and/or thermal limits for the IC chip 104. For example, the hierarchical power management system 124 can be configured to communicate with or include a power management integrated circuit (PMIC) chip 125 (that can either be on-chip or off-chip to the SoC 120) to actually cause the power supplied to certain power rails to be adjusted.

Also, as discussed in more detail below, a hierarchical power management system 124 can also be configured to control power consumption in the processor-based system 100 by throttling performance, which may include controlling clock frequency and/or supply voltage on the power rails provided to the processing devices 110 in the processor-based system 100. Throttling performance may also include controlling activity that causes the consumption of power. These methods, in turn, throttle (i.e., reduce, maintain, or increase) the current demand of such processing devices 110 and, thus, their power consumption in the IC chip 104. Throttling may generally refer to any measure (for example, modifying activity, a clock frequency, and/or a supply voltage) to effect (i.e., reduce, maintain, or increase) power consumption. Performance of clocked circuits in the processing devices 110 in the processor-based system 100 in terms of frequency (f) is related to power (P) according to the power equation $P = c\,f\,V^2$, where 'c' is capacitance and 'V' is voltage. Thus, reducing the frequency of a clocked circuit in a processing device 110 in the processor-based system 100 also reduces its power consumption.

Figure 2:
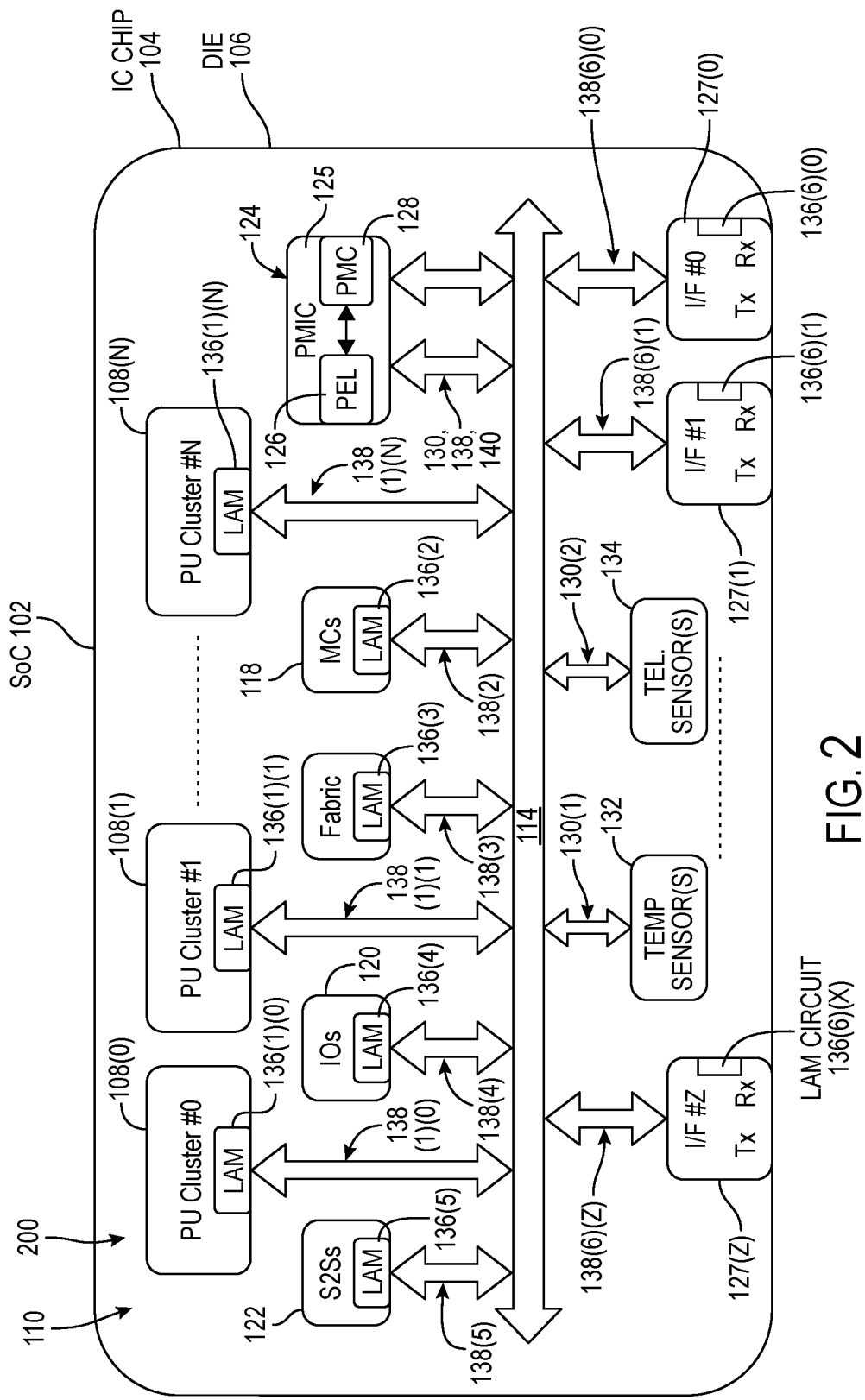
FIG. 2 is a logic diagram of the exemplary processor-based system in FIG. 1, illustrating processing circuits and other support devices communicatively coupled to an internal communication network and an optional hierarchical power management system that is configured to perform power estimation and throttling of power consumption.

FIG. 2 is a logic diagram of the exemplary processor-based system 100 in FIG. 1 illustrating processing devices 110 communicatively coupled to the internal communication network 114. A hierarchical power management system 124 to control power consumption in the IC chip 104 may be provided in accordance with aspects of the present disclosure. Common elements in the processor-based system 100 in FIGS. 1 and 2 are shown with common element numbers and thus are not re-described. The IC chip 104 can also include target devices 200, whose control also affects power, which can include the processing devices 110 and other circuits that are described below. As will be discussed in more detail below, the hierarchical power management system 124 may be configured to throttle power to target devices 200 as well as processing devices 110 to throttle power consumption in the IC chip 104.

As also shown in FIG. 2, the hierarchical power management system 124 may include a centralized power estimation and limiting (PEL) circuit 126 that is configured to estimate power consumption in the IC chip 104 and take actions to limit or throttle power consumption in the IC chip 104. In this example, the PEL circuit 126 can be provided as part of a power management integrated circuit (PMIC) 125 that is integrated into the IC chip 104. The PEL circuit 126 may communicate such power throttling requests to a power management controller (PMC) 128, which is configured to control power provided by voltage rails in the IC chip 104. Throttling power consumption can include both increasing power (e.g., increasing voltage to power rails) to increase power consumption for increased performance and decreasing power (e.g., decreasing voltage to power rails) to decrease power consumption. The hierarchical power management system 124 may be configured to estimate power consumption in the IC chip 104 through receipt of power events 130 reported to it from devices at lower hierarchical levels in the IC chip 104 that provide information that provides an indirect indication of power consumption. For example, the IC chip 104 may have one or more temperature sensor(s) 132 that are configured to report thermal power events 130(1) to the PEL circuit 126 to provide an indication of the temperature in the IC chip 104, which can then be correlated to power consumption by the processor-based system 100 in the IC chip 104. As another example, the IC chip 104 may have one or more telemetry sensor(s) 134 (e.g., current sensors) that are configured to detect and report telemetry power events 130(2) to the PEL circuit 126 to provide an indication of the telematics information in the IC chip 104 which can then also be correlated to power consumption by the processor-based system 100 in the IC chip 104.

The power consumption of the processing devices 110 in the processor-based system 100 may contribute to the power consumption in the IC chip 104. Thus, it may be desired to also have a way for the PEL circuit 126 in the hierarchical power management system 124 to receive a direct indication of power consumption for the processing devices 110. The PEL circuit 126 can then use this information to estimate power consumption in the IC chip 104 and use such information to appropriately throttle the power consumption in the IC chip 104. In this regard, as shown in FIG. 2, hierarchical power management system 124 may also include local area management (LAM) circuits 136 that are each associated with one or more processing devices 110 in the IC chip 104. The LAM circuits 136 could be placed in various places in the IC chip 104, including at corners of the IC chip 104, where power estimation and power limiting may need to be performed. For example, LAM circuits 136(1)(0)-136(1)(N) may be associated with one or more of the PU clusters 108(0)-108(N), as shown in FIG. 2. As another example, LAM circuits 136(2)-136(5), 136(6)(0)-136(6)(X) may also be associated with respective one or more of the memory controllers 118, the internal communication network 114, e.g., the fabric, one or more of the I/O interface circuits 120, the one or more of the S2S interface circuits 122, and/or one or more interface circuits 127(0)-127(Z). Each LAM circuit 136(2)-136(5), 136(6)(0)-136(6)(X) is configured to monitor the activity related to its associated processing device 110 as a monitored processing device 110 to then generate respective activity power events 138(1)(0)-138(1)(N), 138(2)-138(5), 138(6)(0)-138(6)(Z) (referred to herein individually, partially, or collectively as "activity power events 138") that are communicated directly or indirectly to the PEL circuit 126. The activity power events 138(1)(0)-138(1)(N), 138(2)-138(5), 138(6)(0)-138(6)(Z) contain information that relates to the power consumption of the respective monitored processing device 110. For example, the activity power events 138(1)(0)-138(1)(N), 138(2)-138(5), 138(6)(0)-138(6)(Z) could contain processing activity information, or power consumption information that is generated by the respective LAM circuits 136(1)(0)-136(1)(N), 136(2)-136(5), 136(6)(0)-136(6)(X) estimating power consumption of its monitored processing device 110 based on processing activity of its monitored processing device 110.

In either case, in this manner, the activity power events 138 can be reported from local areas in the IC chip 104, where power estimations for particular monitored processing devices 110 are performed, to the centralized PEL circuit 126. The PEL circuit 126 can then be configured to use the received activity power events 138 and/or the other power events 130 to estimate and control (i.e., throttle) power in the processor-based system 100 in the IC chip 104 to achieve a desired performance within an overall power budget for the IC chip 104. For example, the activity power events 138 that are associated with estimations of power consumption of processing devices 110 that can be thought of in essence as power throttle recommendations to the PEL circuit 126 for the PEL circuit 126 to throttle power in the IC chip 104 if the estimated power consumption exceeds the power limits of the IC chip 104 or negatively affects performance in an undesired manner.

The PEL circuit 126 being configured to receive activity power events 138 relating to activity for individual processing devices 110 in the processor-based system 100 allows the PEL circuit 126 to throttle power consumption to certain local processing devices 110 that are responsible for increased power consumption. This allows the PEL circuit 126 to throttle power with discrimination as opposed to throttling power to the power rails or, in other ways, in the IC chip 104 that affects the power delivered to a larger set of processing devices 110 as a whole. For example, as discussed in more detail below, the PEL circuit 126 can be configured to use the received activity power events 138 to perform performance throttling of processing devices 110 in the processor-based system 100 to throttle its power consumption. The PEL circuit 126 can be configured to generate power limiting management responses 140 to be communicated to certain LAM circuits 136 in the processor-based system 100 to cause such LAM circuits 136 to limit the performance of its monitored processing device 110.

Performance throttling of a processing device 110 in the processor-based system 100 to throttle its power consumption can be accomplished in different manners. For example, as discussed in more detail below, performance throttling can be achieved by the PEL circuit 126 by generating a throughput throttling power limiting management response 140, which is destined for the LAM circuit 136(3) associated with the internal communication network 114. The LAM circuit 136(3) can be configured to throttle the throughput of communication traffic in the internal communication network 114, such as at a particular network node in the internal communication network 114, to throttle current demand in the internal communication network 114 and thus its power consumption. Throughput throttling can be isolated to only certain areas or network nodes in the internal communication network 114. In another example, as discussed in more detail below, performance throttling in the processor-based system 100 can be achieved by the PEL circuit 126 by generating a clock throttling power limiting management response 140 to cause a clock circuit (which may be clocking one or more of the processing devices 110) to throttle the speed (i.e., clock frequency) of certain clocked processing devices 110. Clock throttling of a processing device 110 throttles its current demand, which throttles its power consumption. In another example, as discussed in more detail below, performance throttling in the processor-based system 100 can be achieved by throttling or changing the power states of a monitored processing device 110 to throttle its performance and thus its power consumption.

Figure 3:
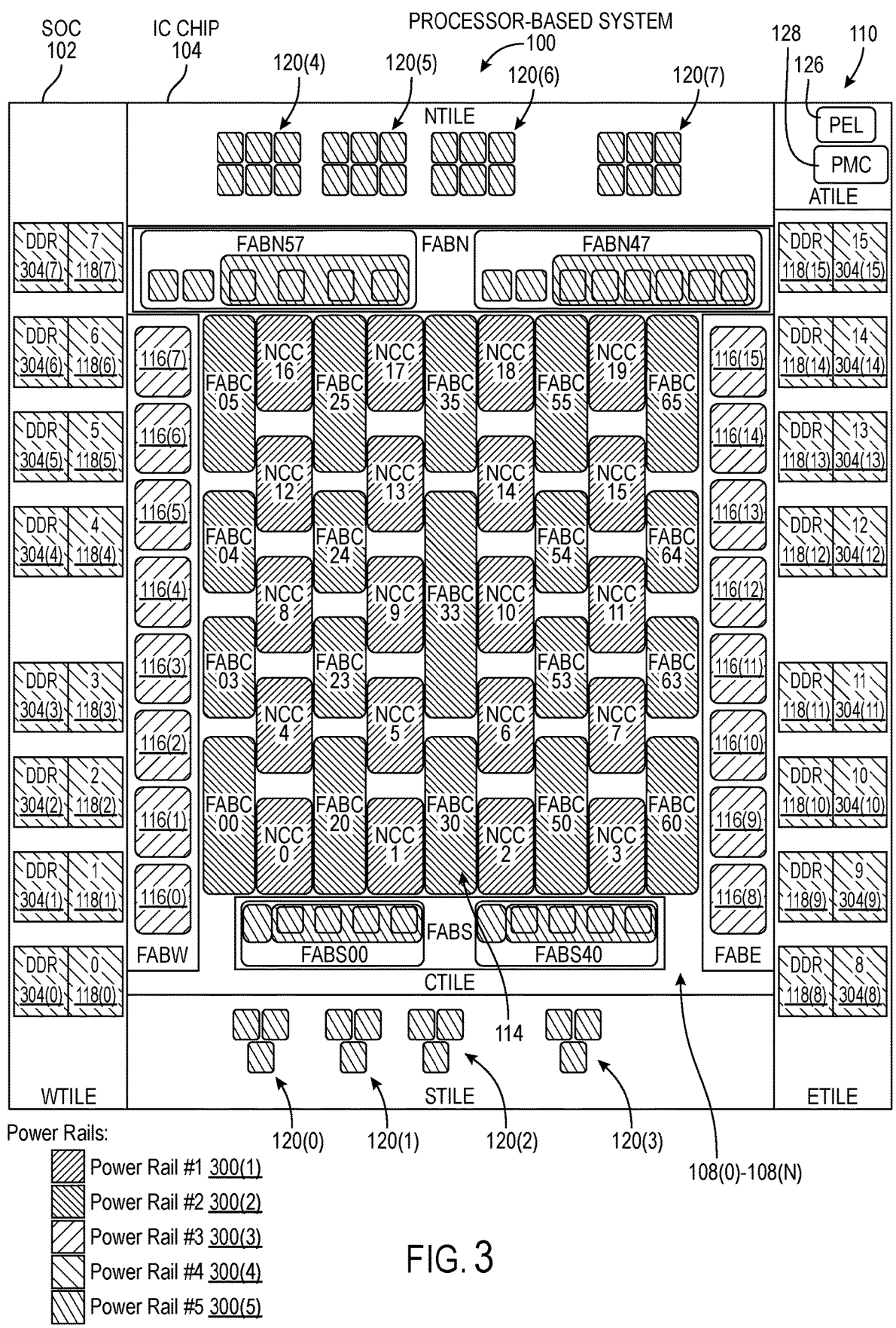
FIG. 3 is a top view of an exemplary physical layout of the semiconductor die ("die") that is an SoC in an IC chip of the processor-based system in FIG. 1 illustrating the physical layout of different tile regions and the devices physically present in such different tile regions, and coded with indicia indicating the separate power rails from which devices are supplied with power from the hierarchical power management system.

FIG. 3 is a top view of an exemplary physical layout of the semiconductor die ("die") 106 of the IC chip 104 in FIG. 1 that includes the processor-based system 100 to illustrate further exemplary details of the physical layout of a hierarchical power management system 124 and an exemplary organization of power rails provided in the processor-based system 100.

As shown in FIG. 3, the IC chip 104 has a physical layout that includes a center tile CTILE, a west tile WTILE, an east tile ETILE, a south tile STILE, a north tile NTILE, and an A-tile ATILE. A tile is a smaller section of a semiconductor die that has been processed in a wafer process and contains a set of IC components. The center tile CTILE in this example includes the PU clusters 108(0)-108(N), shown as NCC0-NCC19. Different numbers of processor cores can be provided in different PU clusters 108(0)-108(N), NCC0-NCC19. In this example, the PU clusters 108(0)-108(N), NCC0-NCC19 are all powered by a same power rail 300(1). The center tile CTILE in this example also includes the internal communication network 114, which is shown by a plurality of center network nodes FABC00-FABC65. The network nodes FABC00-FABC65 are circuits that create a network fabric ("fabric") of communication paths between the different PU clusters 108(0)-108(N) and the supporting processing devices 110. In this example, the network nodes FABC00-FABC65 are powered by a second power rail 300(2). The network nodes FABC00-FABC65 are circuits that can include interconnected switches and/or routers that provide a reliable network fabric that provides and receives data on the internal communications network 114 between different PU clusters 108(0)-108(N) and the supporting processing devices 110. The center tile CTILE in this example also includes the system level cache memory 116(0)-116(7) powered by a third power rail 300(3) to provide shared cache memory 116 for the PU clusters 108(0)-108(N), NCC0-NCC19. The system level cache memory 116(0)-116(7) that is organized into different quadrants adjacent to and coupled to respective memory circuits DDR0-DDR7 that include respective memory controllers 118(0)-118(7) and memory 304(0)-304(7) (e.g., dynamic data random access memory (DDR) circuits) in the west tile WTILE to provide interlacing memory schemes for example. The memory circuits DDR0-DDR7 may be powered by yet a separate, fourth power rail 300(4). The memory circuits DDR0-DDR7 are also communicatively coupled to the internal communication network 114 through the respective network nodes FABC00-FABC05.

With continuing reference to FIG. 3, the center tile CTILE in this example also includes the system level cache memory 116(8)-116(15), also powered by the third power rail 300(3), to provide additional shared cache memory 116 for the PU clusters 108(0)-108(N), NCC0-NCC19. The system level cache memory 116(8)-116(15) may be organized into different quadrants adjacent to respective memory circuits DDR8-DDR15 that include respective memory controllers 118(8)-118(15) and coupled memory 304(8)-304(15) (e.g., DDR circuits) in the east tile ETILE to provide interlacing memory schemes for example. The memory circuits DDR8-DDR15 are also shown as being powered by the same fourth power rail 300(4) as is powering the memory circuits DDR0-DDR7 in the west tile WTILE. The memory circuits DDR8-DDR15 are also communicatively coupled to the internal communication network 114 through the respective network nodes FABC60-FABC65.

With continuing reference to FIG. 3, the center tile CTILE of the IC chip 104 in this example includes request node circuits FABS00, FABS40, FABN57, FABN47 that are coupled to the internal communication network 114 to provide network interfaces between the I/O interface circuits 120(0)-120(3), 120(4)-120(7) and the internal communication network 114 in the respective south tile STILE and north tile NTILE. The request node circuits FABS00, FABS40, FABN57, FABN47 manage the traffic requests from the I/O interface circuits 120(0)-120(3), 120(4)-120(7) to the internal communication network 114 and vice versa. The request node circuits FABS00, FABS40, FABN57, FABN47 and the I/O interface circuits 120(0)-120(3), 120(4)-120(7) in this example are powered by a fifth power rail 300(5).

With continuing reference to FIG. 3, the A-tile ATILE in the IC chip 104 includes the PEL circuit 126 and the PMC 128 of the hierarchical power management system 124 in this example.

Thus, as shown in FIG. 3, the processing devices 110 in the processor-based system 100 in the IC chip 104 are powered by a series of different power rails 300(1)-300(5). Thus, the PEL circuit 126 in the hierarchical power management system 124 has the resolution of each of these different power rails 300(1)-300(5) in which to vary the voltage on such power rails 300(1)-300(5) to throttle power consumption in the IC chip 104 based on the activity power events 130, 138. Note that each power rail 300(1)-300(5) can actually be included as a single or multiple power rails.

Figure 4:
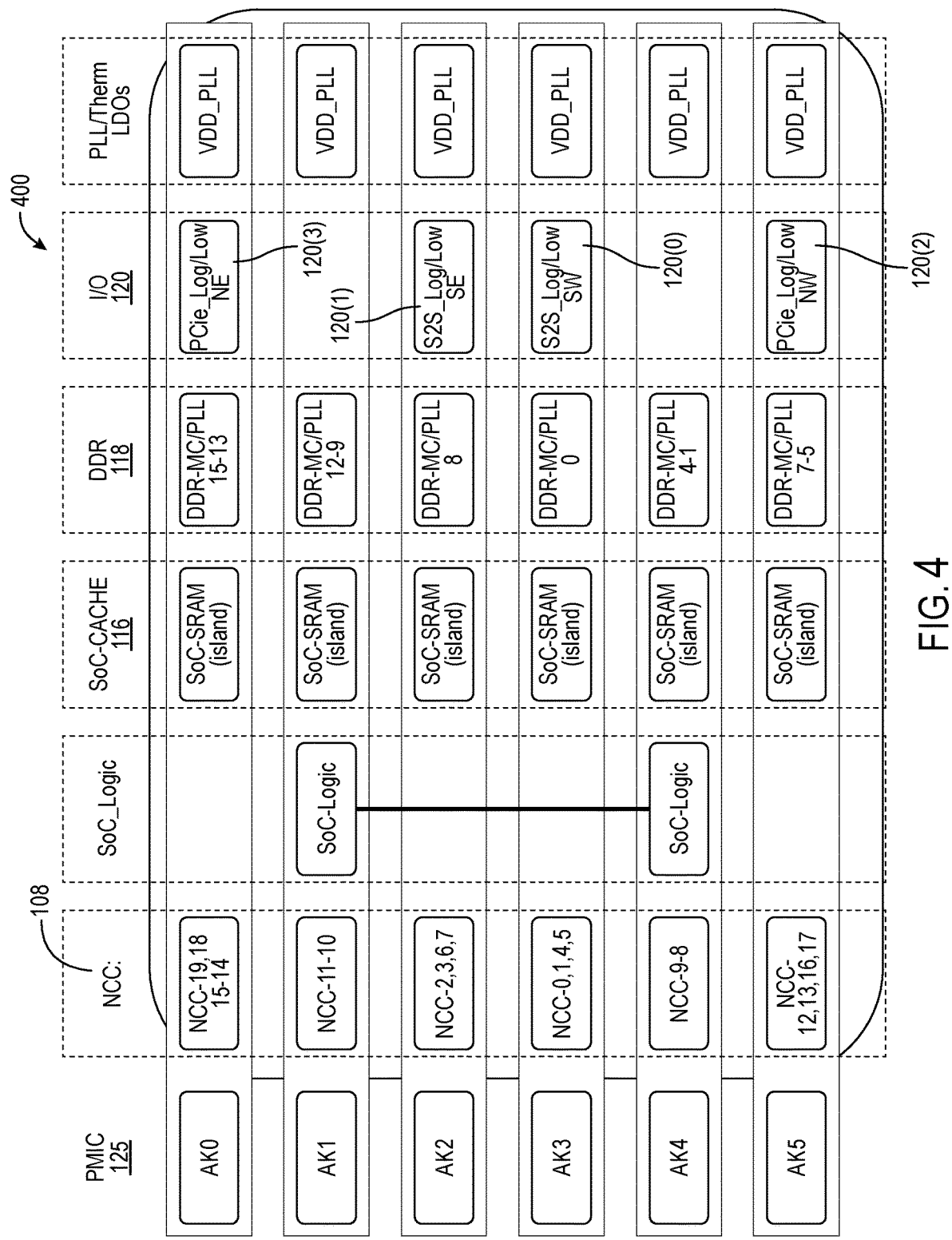
FIG. 4 is a table illustrating an exemplary assignment of power rails driven by respective power management ICs (PMIC), in the processor-based system in FIG. 1, to devices in the processor-based system for supplying power to such devices.

FIG. 4 is a table 400 illustrating an exemplary assignment of power management circuits AK0-AK5 in the PMIC 125 in the processor-based system 100 to devices in the processor-based system 100 for supplying power to such devices. Power management circuits AK0-AK5 can be responsible for controlling one or more different power rails 300(1)-300(5), as shown in FIG. 3, to supply power to various components. Multiple devices in the processor-based system 100 can be coupled to the same power rail 300(1)-300(5) to receive power. For example, as shown in FIG. 4, in this example, PU clusters NCC19, 18, 15, 14 are powered from power rails controlled by power management circuit AK0, PU clusters NCC 11-10 are powered from power rails controlled by power management circuit AK1, PU clusters NCC2, 3, 6, 7 are powered from power rails controlled by power management circuit AK2, PU clusters NCC0, 1, 4, 5 are powered from power rails controlled by power management circuit AK3, PU clusters NCC9-8 are powered from power rails controlled by power management circuit AK4, and PU clusters NCC12, 13, 16, 17 are powered from power rails controlled by power management circuit AK5. Also, as shown in FIG. 4, a single device in the processor-based system 100 can be coupled to more than one power rail to receive power. For example, power supplied to the logic circuits (SoC_Logic) can be controlled by the multiple power management circuits AK1-AK4. The cache memory 116 can be supplied power from power rails controlled by the power management circuits AK0-AK5. Different memory controllers 118 are shown as being powered by power rails controlled by the power management circuits AK0-AK5. The I/O interface circuits 120(0)-120(3) are shown as being powered by power rails controlled by separate respective power management circuits AK3, AK2, AK5, AK0.

Figure 5:
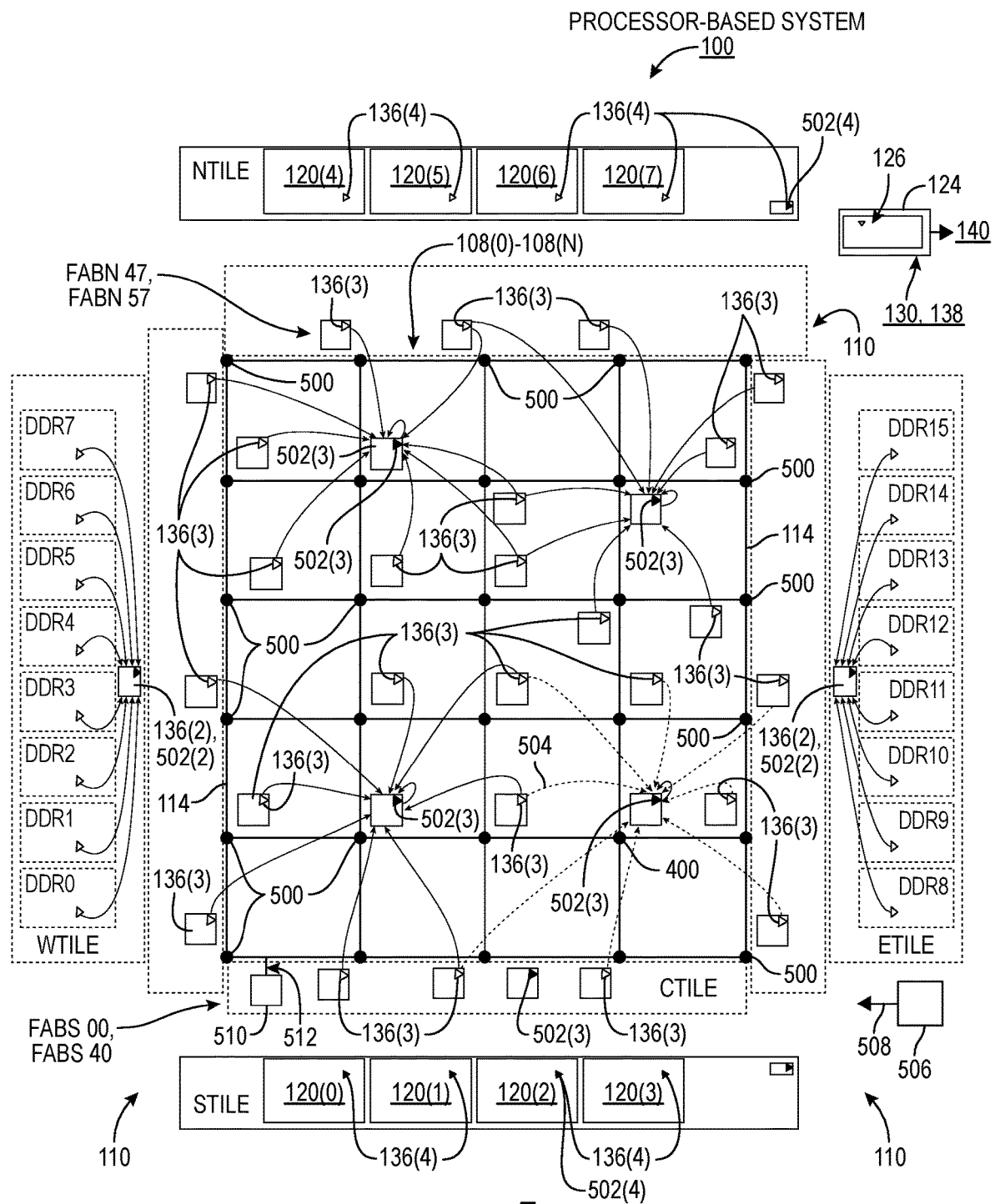
FIG. 5 is another top view of the processor-based system in the IC chip in FIG. 1, illustrating local area management (LAM) circuits, regional activity management (RAM) circuits, and a power estimation and limiting (PEL) circuit as part of a hierarchical power management system, wherein the hierarchical power management system is configured to locally monitor the activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response.

FIG. 5 is another top view of the processor-based system 100 in the IC chip 104 in FIG. 1, illustrating local area management (LAM) circuits 136 and the PEL circuit 126 as part of the hierarchical power management system 124. As discussed above with regard to FIG. 2, the LAM circuits 136 can be configured to locally monitor activity of processing devices 110, such as the PU clusters 108(0)-108(N) in the processor-based system 100 to estimate and throttle its power consumption and report activity power events 138 regarding estimated power consumption to the PEL circuit 126. The processor-based system 100 in this example includes a clock circuit 506 that generates a clock signal 508 to clock the PU clusters 108(0)-108(N) to control the speed of the PU clusters 108(0)-108(N). The PEL circuit 126 is configured to collect activity power events 138 regarding power consumption of the monitored processing devices 110 and issue power limiting management responses 140 in response to throttle power consumption in the IC chip 104.

As shown in FIG. 5, a plurality of LAM circuits 136(3) are distributed in the center tile CTILE and associated with respective network node 500 (as processing devices 110) of the internal communication network 114. For example, the internal communication network 114 can be a mesh network, as shown in FIG. 5. The internal communication network 114 is capable of routing communication traffic from the PU clusters 108(0)-108(N) through different network nodes 500 based on performance and traffic characteristics of the internal communication network 114. In this manner, the throughput of the internal communication network 114 is not limited by any single network node 500. The processor-based system 100 in this example includes a clock circuit 510 that generates a clock signal 512 to clock the network nodes 500 to control the speed of the internal communication network 114. The clock circuit 510 is another example of a target device 200 in the IC chip 104. As will be discussed in more detail below, the LAM circuits 136(3) associated with the network nodes 500 in the internal communication network 114 are configured to sample the processing activity of respectively assigned network nodes 500 to generate a plurality of activity samples. The LAM circuits 136(3) are then configured to estimate the power consumption of the assigned network node 500 based on the activity samples regarding its assigned network node 500 to generate an activity power event 138 based on the such estimated power consumption of the respective network node 500.

Also, as shown in FIG. 5, in this example, the hierarchical power management system 124 may also include regional activity management (RAM) circuits 502(3) configured to monitor activity of the internal communication network 114. The RAM circuits 502(3) can be located in a particular region of the internal communication network 114, with each being assigned and coupled to a subset of the LAM circuits 136(3). The RAM circuits 502(3) can be intermediate power management circuits in the hierarchical power management system 124. The RAM circuits 502(3) may be coupled to the PEL circuit 126 through a second communication network 504. The RAM circuits 502(3) can be communicatively and hierarchically located between the LAM circuits 136(3) and the centralized PEL circuit 126. In some examples, the RAM circuits 502(3) are configured to receive and aggregate activity power events 138 reported by assigned LAM circuits 136(3) regarding activity of their monitored network node 500. The RAM circuits 502(3) can then aggregate these activity power events 138 and report an aggregated activity power event to the PEL circuit 126 so that the PEL circuit 126 can determine how the power consumption of network nodes 500 should be throttled to achieve a desired overall performance of the internal communication network 114 while also maintaining power consumption within desired limits. The PEL circuit 126 can communicate a power limiting management response 140 back to a given RAM circuit 502(3) to perform throughput throttling of a given network node(s) 500 in response to the power consumption of a network node(s) 500 being determined to exceed desired limits. For example, as discussed in more detail below, the RAM circuit 502(3) can be configured to throttle throughput of a given network node(s) 500 by selectively enabling and disabling communication traffic through the network node(s) 500.

Also, as shown in FIG. 5, in this example, a plurality of LAM circuits 136(2) are distributed in the west tile WTILE and the east tile ETILE and associated with respective memory circuits DDR0-DDR7, DDR8-DDR15 (as processing devices 110). As will also be discussed in more detail below, the LAM circuits 136(2) associated with the memory circuits DDR0-DDR7, DDR8-DDR15 are configured to sample processing activity of respectively assigned memory circuits DDR0-DDR7, DDR8-DDR15 to generate a plurality of activity samples. The LAM circuits 136(2) are then configured to estimate the power consumption of the assigned memory circuit DDR0-DDR7, DDR8-DDR15 based on the activity samples regarding their assigned network node 500 to generate an activity power event 138 based on the such estimated power consumption of the respective memory circuits DDR0-DDR7, DDR8-DDR15.

Also, as shown in FIG. 5, in this example, the hierarchical power management system 124 also includes regional RAM circuits 502(2) configured to monitor activity of the memory circuits DDR0-DDR7, DDR8-DDR15. The RAM circuits 502(2) are located in a particular region of the memory circuits DDR0-DDR7, DDR8-DDR15, with each being assigned and coupled to a subset of the LAM circuits 136(2). The RAM circuits 502(2) are communicatively and hierarchically located between the LAM circuits 136(2) and the centralized PEL circuit 126. The RAM circuits 502(2) are coupled to the PEL circuit 126 through the second communication network 504. The RAM circuits 502(2) are configured to receive and aggregate activity power events 138 reported by assigned LAM circuits 136(2) regarding activity of their monitored memory circuits DDR0-DDR7, DDR8-DDR15. The RAM circuits 502(2) can then aggregate these activity power events 138 and report an aggregated activity power event to the PEL circuit 126 so that the PEL circuit 126 can determine how power consumption of the memory circuits DDR0-DDR7, DDR8-DDR15 should be throttled to achieve a desired overall performance of the memory circuits DDR0-DDR7, DDR8-DDR15 while also maintaining power consumption within desired limits. The PEL circuit 126 can communicate a power limiting management response 140 back to a given RAM circuit 502(2) to perform throughput and/or performance throttling of a given memory circuit(s) DDR0-DDR7, DDR8-DDR15 in response to the power consumption of a memory circuit DDR0-DDR7, DDR8-DDR15 being determined to exceed desired limits. For example, as discussed in more detail below, the RAM circuit 502(2) can be configured to throttle throughput and/or performance of a given memory circuit(s) DDR0-DDR7, DDR8-DDR15 by selectively enabling and disabling memory access requests/responses to the memory circuits DDR0-DDR7, DDR8-DDR15.

Also, as shown in FIG. 5, in this example, the hierarchical power management system 124 also includes regional RAM circuits 502(4) configured to monitor activity of the I/O interface circuits 120(0)-120(7). The RAM circuits 502(4) are located in a particular region of the I/O interface circuits 120(0)-120(7), with each being assigned and coupled to a subset of the LAM circuits 136(4) as shown. The RAM circuits 502(4) are communicatively and hierarchically located between the LAM circuits 136(4) and the centralized PEL circuit 126. The RAM circuits 502(4) are coupled to the PEL circuit 126 through the second communication network 504. The RAM circuits 502(4) are configured to receive and aggregate activity power events 138 reported by assigned LAM circuits 136(4) regarding activity of their monitored I/O interface circuits 120(0)-120(7). The RAM circuits 502(4) can then aggregate these activity power events 138 and report an aggregated activity power event to the PEL circuit 126 so that the PEL circuit 126 can determine how power consumption of the I/O interface circuits 120(0)-120(7) should be throttled to achieve a desired overall performance of the I/O interface circuits 120(0)-120(7) while also maintaining power consumption within desired limits. The PEL circuit 126 can communicate a power limiting management response 140 back to a given RAM circuit 502(4) to perform throughput and/or performance throttling of a given I/O interface circuit(s) 120(0)-120(7) in response to the power consumption of an I/O interface circuit(s) 120(0)-120(7) being determined to exceed desired limits. For example, as discussed in more detail below, the RAM circuit 502(4) can be configured to throttle throughput and/or performance of a given I/O interface circuit(s) 120(0)-120(7) by selectively enabling and disabling access requests/responses to the I/O interface circuit(s) 120(0)-120(7).

As shown back in FIG. 2, LAM circuits 136(1)(0)-136(1)(N) can also be associated with each PU cluster 108(0)-108(N) in the processor-based system 100 to sample activity therein to estimate power consumption in a respective PU cluster 108(0)-108(N). The LAM circuits 136(1)(0)-136(1)(N) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(1)(0)-136(1)(N) are coupled to the PEL circuit 126 through the second communication network 504. The PEL circuit 126 can generate power-limiting management responses 140 in response to throttle the performance of the PU clusters 108(0)-108(N).

As also shown in FIG. 2, LAM circuits 136(5) can also be associated with each S2S interface circuit 122(0)-122(Y) in the processor-based system 100 to sample activity therein to estimate power consumption in a respective S2S interface circuit 122(0)-122(Y). The LAM circuits 136(5) can be configured to generate activity power events 138, including the estimated power consumptions in response to a RAM circuit 502, which in turn aggregates such activity power events 138 to the PEL circuit 126. The RAM circuits 502 assigned to the subset of LAM circuits 136(5) are coupled to the PEL circuit 126 through the second communication network 504. In response, the PEL circuit 126 can generate power-limiting management responses 140 to throttle the performance of the S2S interface circuits 122(0)-122(Y).

As shown back in FIG. 2, LAM circuits 136(6)(0)-136(6)(X) can also be associated with each interface circuit 127(0)-127(Z) in the processor-based system 100 to sample activity therein to estimate power consumption in a respective interface circuit 127(0)-127(Z). The LAM circuits 136(6)(0)-136(6)(X) can be configured to generate activity power events 138 that include the estimated power consumptions in response to a RAM circuit 502, which in turn aggregates such activity power events 138 to the PEL circuit 126. The RAM circuits 502 assigned to a subset of LAM circuits 136(6)(0)-136(6)(X), is coupled to the PEL circuit 126 through the second communication network 504. The PEL circuit 126 can generate power limiting management responses 140 in response to throttle the performance of the interface circuits 127(0)-127(Z).

In this example, any of the RAM circuits 502, 502(2)-502(4) discussed above can also include circuitry to behave functionally as a LAM circuit for an assigned processing device 110. In this regard, any of the RAM circuits 502, 502(2)-502(4) can also be configured to sample the processing activity of its respective assigned processing device 110 to generate a plurality of activity samples for such processing device 110. Such RAM circuits 502, 502(2)-502(4) can be configured to estimate the power consumption of its assigned processing device 110 based on the activity samples regarding its assigned processing device 110 to generate an aggregated activity power event based on the such estimated power consumption of the respective processing device 110 and the other received activity power events 138 from its coupled LAM circuits 136(1)(0)-(1)(N), 136(2)-136(5), 136(6)(0)-136(6)(X).

Note that in any of the above-referenced examples, the RAM circuits 502 are optional for any of the monitored processing devices 110, and their respective LAM circuits 136(1)-136(6) can be configured to communicate activity power events 138 directly to the PEL circuit 126.

Figure 6:
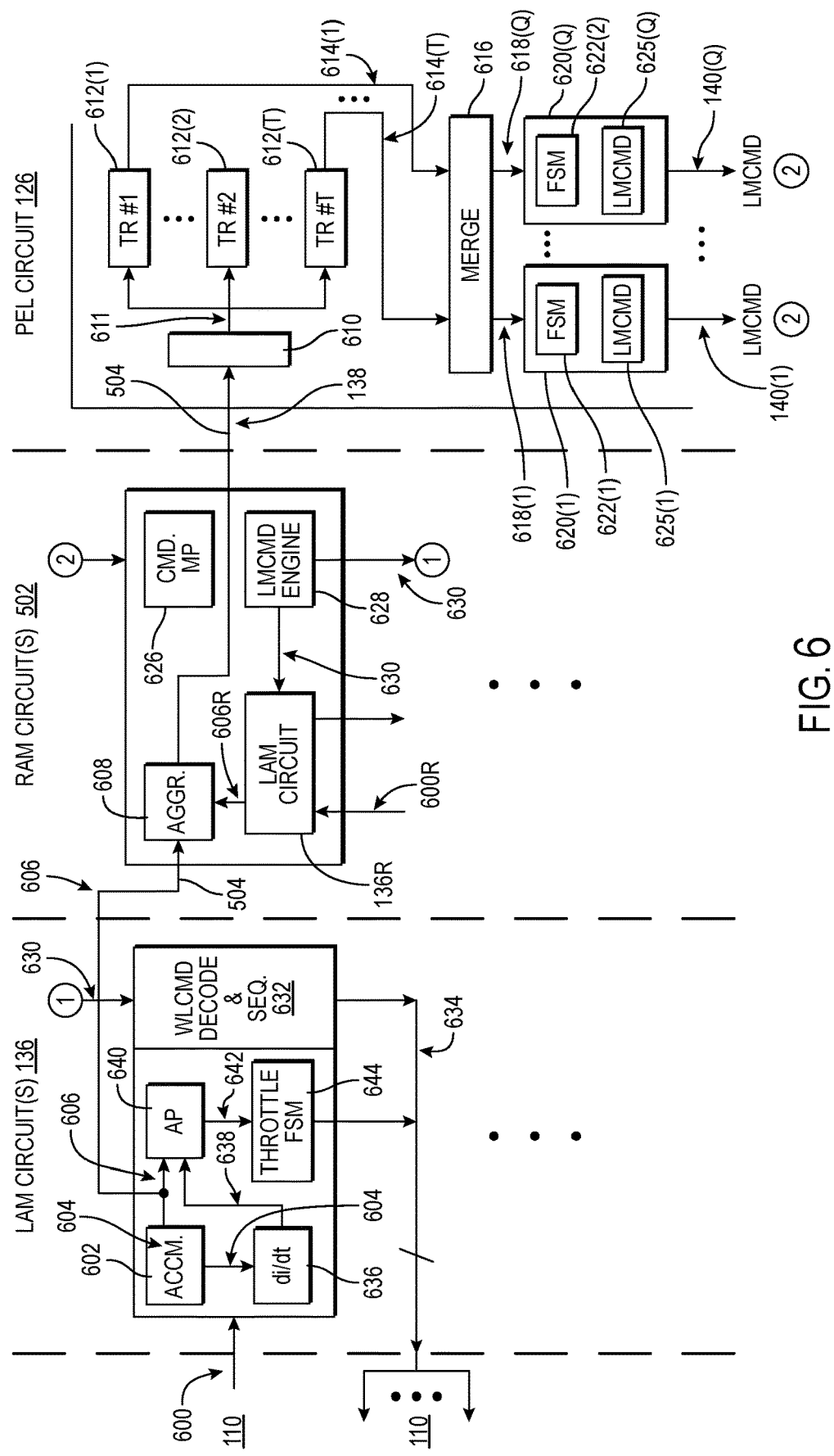
FIG. 6 is a schematic diagram of an exemplary three (3) level hierarchical power management system that can be provided in the processor-based system in the IC chip in FIG. 1, wherein the three (3) level hierarchical power management system may include: a first, local level of LAM circuits configured to perform local device monitoring and power consumption throttling, and report activity power events regarding monitored processing device power consumption, a second, intermediate level of RAM circuits configured to receive and aggregate local activity power events, and a third, centralized level of a PEL circuit configured to collect aggregated activity power events regarding power consumption of the monitored processing devices and throttle power in the IC chip in response.

FIG. 6 is a schematic diagram illustrating additional exemplary detail of a three (3) level hierarchical power management system 624 that can be provided as the hierarchical power management system 124 in the processor-based system 100 in the IC chip 104 in FIGS. 1-3 and 5. Common elements between the hierarchical power management system 624 in FIG. 6 and the hierarchical power management system 124 in FIGS. 1-3 and 5 are shown with common element numbers. In this regard, FIG. 6 illustrates a single LAM circuit 136 communicatively coupled to a single RAM circuit 502 which is coupled to the PEL circuit 126. Note, however, that this is to simplify the illustration in FIG. 6. In the hierarchical power management system 624 in FIG. 6, there can be a plurality of RAM circuits 502 that are communicatively coupled to the PEL circuit 126. There can also be a plurality of LAM circuits 136 that are communicatively coupled to each RAM circuit 502 of the plurality of RAM circuits 502. The discussion below regarding the exemplary operation of the LAM circuit 136 and RAM circuit 502 are equally applicable to any number of LAM circuits 136 and RAM circuits 502 included in the processor-based system, including the LAM circuits 136(1)(0)-(1)(N), 136(2)-136(5), 136(6)(1)-136(6)(X) and the RAM circuits 502, 502(2)-502(4).

With reference to FIG. 6, the LAM circuit 136 in this example is configured to sample the processing activity as a received activity sample 600 of an assigned, monitored processing device 110 in each cycle of a given local time window. The LAM circuit 136 periodically samples activity of its monitored processing device 110 in a local time window representing the activity of the assigned, monitored processing device 110 in that local time window. In this example, the LAM circuit 136 is configured to correlate received activity samples 600 into a power consumption during a given local time window for the activity of the processing device 110 for that given local time window. The LAM circuit 136 includes an accumulate circuit 602 that is configured to accumulate the estimated power consumptions based on the received activity samples 600 sampled in a given local time window to generate an estimated current demand 604 for the monitored processing device 110 for the local time window. The estimated current demand 604 is an estimate of the accumulated current measurement reported by the assigned processing device 110 (i.e., power consumption) over the local time window. The accumulate circuit 602 may then provide the estimated current demand 604 (current demand over time) for each local time window in a generated activity power event 606 on the second communication network 504, representing the estimated power consumption of the monitored processing device 110 that is communicated to the RAM circuit 502 assigned to the LAM circuit 136. The accumulate circuit 602 may repeat the same process for subsequent local time windows to accumulate the estimated power consumptions for received activity samples 600 during the local time window to generate a next estimated current demand 604 for the monitored processing device 110.

With continuing reference to FIG. 6, the RAM circuit 502 may include an aggregation circuit 608 that is configured to aggregate the received activity power events 606 from its coupled LAM circuits 136 into a generated aggregated activity power event 138. The RAM circuit 502 may then be configured to communicate the aggregated activity power event 138 on the second communication network 504 to the PEL circuit 126. Note that in this example, the RAM circuit 502 also includes its own LAM circuit 136R that may be configured like the LAM circuit 136 in FIG. 6. In this regard, the LAM circuit 136R may be configured to sample the processing activity 600R of an assigned processing device 110 into a plurality of activity samples 600R. The processing activity 600R of the assigned processing device 110 may be sampled periodically by the LAM circuit 136R to generate a plurality of activity samples over a given local time window representing the activity of the assigned, monitored processing device 110. The LAM circuit 136R is configured to determine a current flow rate and/or a change in the current flow rate (i.e., di/dt) of current provided to the assigned processing device 110 and represented by the received plurality of activity samples 600. The LAM circuit 136R can be programmed to correlate processing activity to power consumption to estimate the power consumption of the monitored processing device 110 over the local time window. The LAM circuit 136R can then be configured to generate an activity power event 606 representing the estimated power consumption of the monitored processing device 110 that is communicated to the aggregation circuit 608 of the RAM circuit 502 to be aggregated into the aggregated activity power event 138.

With continuing reference to FIG. 6, the PEL circuit 126 may be configured to receive the aggregated activity power events 138 from the one or more RAM circuits 502 included in the hierarchical power management system 624. In this example, the PEL circuit 126 includes a decode circuit 610 that is configured to decode the received aggregated activity power events 138 into decoded activity power events 611 to be routed to a corresponding activity tracker circuit 612(1)-612(T) that are each associated with a monitored processing device 110 in the processor-based system 100. The PEL circuit 126 can also include other energy tracker circuits (not shown) that are associated with other power events (e.g., temperature, droop detection) that can also affect how the PEL circuit 126 decides to throttle power. The activity tracker circuits 612(1)-612(T) may be configured to aggregate associated activity power events 138 for an assigned monitored processing device 110 to determine whether power consumption for a monitored processing device 110 exceeds a defined threshold current flow rate/change in current flow rate (di/dt). The activity tracker circuits 612(1)-612(T) can also each include a power limit management policy that can be configured to generate respective power throttle recommendations 614(1)-614(T) for the PEL circuit 126 to use to determine how to throttle the distributed power and/or performance of the monitored processing devices 110 to throttle power consumption.

With continuing reference to FIG. 6, the PEL circuit 126 also includes a merge circuit 616 that merges the power throttle recommendations 614(1)-614(T) for the individual monitored processing devices 110 into merged power throttle recommendations 618(1)-618(Q). The merged power throttle recommendations 618(1)-618(Q) are provided to respective assigned target circuits 620(1)-620(Q). Each target circuit 620(1)-620(Q) is associated with a different target device 200 in the processor-based system 100 in which the PEL circuit 126 can issue power limiting management responses 140(1)-140(Q) to limit the power consumption of such target device 200. The target devices 200 are devices in the IC chip 104 whose operational control (e.g., operating voltage, frequency, workload) can affect power consumption in the IC chip 104. The target devices in the IC chip 104 can include more than just the processing devices 110 in the processor-based system 100. For example, the target devices 200 can include the power rails 300(1)-300(5), as shown in FIG. 3 and/or any of the processing devices 110 in the processor-based system 100. The PEL circuit 126 can be programmed to map (e.g., through firmware, electronic fuses, etc.) the merged power throttle recommendations 618(1)-618(Q) to a particular target device 200, and thus a target circuit 620(1)-620(Q), that may not directly correlate to each other. For example, it may be desired for the PEL circuit 126 to throttle power consumption of the I/O interface circuits 120(0)-120(X) by not only throttling power consumption for the I/O interface circuits 120(0)-120(X) but also by throttling power of the PU clusters 108(0)-108(N) that may be contributing to the power consumption by the I/O interface circuits 120(0)-120(X). In this manner, the merged power throttle recommendations 618(1)-618(Q) and/or other power events related to power issues and power consumption in the IC chip 104 can be mapped in the PEL circuit 126 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 126 can be configured and changed even after the IC chip 104 is deployed in an application.

With continuing reference to FIG. 6, the target circuits 620(1)-620(Q) may each be configured to determine if the power consumption of an associated target device 200 in the processor-based system 100 should be throttled based on the merged power throttle recommendations 618(1)-618(Q) provided to the target circuits 620(1)-620(Q). The target circuits 620(1)-620(Q) can each include finite state machine (FSM) circuits 622(1)-622(Q) that are configured to analyze the respective received merged power throttle recommendation 618(1)-618(Q) to determine if the power consumption of an associated target device 200 should be throttled. If an FSM circuit 622(1)-622(Q) determines that the power consumption of an associated target device 200 in the processor-based system 100 should be throttled, the FSM circuit 622(1)-622(Q) causes an associated power limiting command generation circuit 625(1)-625(Q) to generate a power limiting management response 140(1)-140(Q) to cause the power consumption of a target device 200 associated with the power limiting management response 140(1)-140(Q) to limit power consumption.

For example, if the target circuit 620(1)-620(Q) is assigned to a target device 200 of a power rail 300(1)-300(5), the target circuit 620(1)-620(Q) can be configured to determine how to throttle the voltage to the associated power rail 300(1)-300(5) to control power consumption of processing devices 110 powered by such power rail 300(1)-300(5).

The respective power limiting command generation circuit 625(1)-625(Q) can be configured to generate a performance throttling power limiting management response 140(1)-140(Q) to cause the voltage provided to the associated power rail 300(1)-300(5) to be throttled to control power consumption of processing devices 110 powered by such associated power rail 300(1)-300(5).

In another example, if the target circuit 620(1)-620(Q) is assigned to a target device 200, such as the internal communication network 114, the target circuit 620(1)-620(Q) can be configured to determine how to throttle performance of the internal communication network 114 to control power consumption of the internal communication network 114. For example, to throttle the throughput performance of the internal communication network 114, the target device 200 may be the clock circuit 506 (FIG. 5) that is configured to clock the internal communication network 114. The clock circuit 506 is another example of a target device 200 in the IC chip 104. The target circuit 620(1)-620(Q) can determine a throttle frequency of the clock signal 508 generated by the clock circuit 506 (FIG. 5) for generating a clock throttling power limiting management response 140(1)-140(Q). The clock throttling power limiting management response 140(1)-140(Q) may cause the clock signal 508 to be throttled, which will, in turn, throttle the speed and the throughput performance of the internal communication network 114 and thus its power consumption and/or other circuits clocked by the clock signal 508.

In another example, if the target circuit 620(1)-620(Q) is assigned to a target device 200 as a PU cluster 108(0)-108(N) or any other processing device 110, the target circuit 620(1)-620(Q) can be configured to determine how to throttle performance of the internal communication network 114 to control power consumption of the internal communication network 114. For example, to throttle performance of the PU cluster 108(0)-108(N) or other processing device 110, the target device 200 may be the clock circuit 506 (FIG. 5) that is configured to clock the PU clusters 108(0)-108(N). The target circuit 620(1)-620(Q) can determine a throttle frequency of the clock signal 508 generated by the clock circuit 506 for generating a performance power limiting management response 140(1)-140(Q). The clock throttling power limiting management response 140(1)-140(Q) will cause the clock signal 508 to be throttled, which will, in turn, throttle the performance of the PU clusters 108(0)-108(N) or other processing devices 110.

As shown in FIG. 6, in this example, to communicate the power limiting management responses 140(1)-140(Q) generated by the PEL circuit 126 to affect a power throttling of a target device 200 in the processor-based system 100, the power limiting management responses 140(1)-140(Q) are communicated to a target device 200 in the processor-based system 100. For target devices 200 that are monitored processing devices 110 monitored by a LAM circuit 136 or RAM circuit 502, the PEL circuit 126 can be configured to communicate an associated power limiting management response 140(1)-140(Q) to the RAM circuit 502. The RAM circuit 502 in this example includes a command processor 626 that is configured to receive a power limiting management response 140(1)-140(Q) to process the power limiting management response 140(1)-140(Q) to identify the LAM circuit 136 to communicate with to effectuate the power throttling requested in the received power limiting management response 140(1)-140(Q). In this example, the RAM circuit 502 includes a limiting command engine circuit 628 that is configured to generate a local power limiting management response 630 directed to the LAM circuit 136 that can effectuate the power throttling requested in the received power limiting management response 140(1)-140(Q). Note that if the local power limiting management response 630 is to throttle power consumption of multiple processing devices 110 monitored by multiple LAM circuits 136 associated with the RAM circuit 502, the limiting command engine circuit 628 can address the local power limiting management response 630 to multiple LAM circuits 136. Also note that in this example, if the RAM circuit 502 includes the LAM circuit 136R, and the RAM circuit 502 is monitoring a processing device 110 that is the target device 200 to be throttled, the limiting command engine circuit 628 generates the local power limiting management response 630 directed to the LAM circuit 136R.

With continuing reference to FIG. 6, in response to a LAM circuit 136 receiving a local power limiting management response 630, a power limiting management decode and sequencer circuit 632 may process the received local power limiting management response 630. The power limiting management decode and sequencer circuit 632 may be configured to determine a power throttling response to be effectuated to a monitored processing device 110 based on the local power limiting management response 630. In this regard, the power limiting management decode and sequencer circuit 632 may be configured to generate local throttle signals 634 to cause the power consumption in the processing device 110 to be throttled. For example, power limiting management decode and sequencer circuit 632 can be configured to generate a sequence of local throttle signals 634 to continually throttle up or down the power consumption of the monitored processing device 110 associated with its LAM circuit 136.

Note that in the sequence of operations and communications described above with regard to the LAM circuits 136 communicating activity power events 606 to the RAM circuits 502, and the RAM circuits 502 communicating aggregated activity power events 138 to the PEL circuit 126, communication delays are incurred. There is a delay between generating the activity samples 600 of sampling of power consumptions in a processing device 110 in a LAM circuit 136 and the reporting and receipt of an associated aggregated activity power event 138 in the PEL circuit 126. This delay can be particularly large for an IC chip 104 that has a larger area, such as one that includes a number of PU clusters 108(0)-108(N) and other processing devices 110 as in the processor-based system 100. By the time the PEL circuit 126 receives the associated aggregated activity power event 138 and processes such to a generation of an associated power limiting management response 140(1)-140(Q), the power consumed by the monitored processing device 110 may have already exceeded desired power limits in an undesired manner and/or for an undesired amount of time, possibly causing the power consumption in the IC chip 104 to exceed designed power limits. Further, instantaneous current demand by a monitored processing device 110 can cause di/dt events or voltage droop events that can cause performance issues and/or failures that may not be able to be timely addressed by the PEL circuit 126.

To mitigate the delay in the PEL circuit 126 receiving aggregated activity power events 138 associated with monitored processing devices 110 in the processor-based system 100 that may affect throttling of power consumption within the processor-based system 100, each of the LAM circuits 136, 136R can also be configured to directly throttle performance of an associated monitored processing device 110 to throttle its current demand and thus throttle its power consumption. This gives the PEL circuit 126 more reaction time to receive and process aggregated activity power events 138 to determine how power consumption in the processor-based system 100 should be throttled to achieve a desired overall performance while also maintaining power consumption within desired limits. In this manner, the LAM circuits 136, 136R may be able to more timely mitigate a power issue by locally throttling power consumption of its specific monitored processing device 110 on a device granularity (without having to throttle performance in other processing devices 110). The LAM circuits 136, 136R can be configured to continuously monitor and throttle power consumption locally in its monitored processing device 110, co-existent with the PEL circuit 126 generating power limiting management responses 140 to limit power consumption by target devices 200 in the processor-based system 100.

In this regard, as shown in FIG. 6, the LAM circuit 136 in this example includes a di/dt circuit 636 to track the rate of change of power consumption by the processing device 110 for local power consumption throttling of its monitored processing device 110. In this regard, the di/dt circuit 636 may be configured to receive the estimated current demand 604 for the activity of the processing device 110 sampled by the LAM circuit 136 from the accumulate circuit 602 in each local time window. For each incoming estimated current demand 604 received (e.g., received for a given local time window), the di/dt circuit 636 may be configured to generate a next summed current demand 638 of such incoming estimated current demand 604 in the next local time window from the accumulate circuit 602 with one or more previously received estimated current demands 604 received for a previous estimated current demand 604 in a previous local time window. In this manner, the next summed current demand 638 is a running sum of the estimated current demands 604 for the processing device 110 over consecutive local time windows. The di/dt circuit 636 may provide the next summed current demand 638 to an application processor 640 that provides a determined next current flow rate 642 based on the next summed current demand 638 to a throttle FSM circuit 644. The throttle FSM circuit 644 may be configured to determine on an ongoing basis whether the next current flow rate 642 of the assigned processing device 110 exceeds a threshold current flow rate or indicates an excessive change in current flow rate beyond those configured for the monitored processing device 110 in the LAM circuit 136. In response to determining that the next current flow rate 642 of the assigned processing device 110 exceeds the threshold current flow rate or indicates an excessive change in current flow rate, the throttle FSM circuit 644 is configured to generate the local throttle signals 634 to throttle the power consumption of the monitored processing device 110.

In this manner, the LAM circuit 136 may be configured to continually monitor the ongoing current flow rate of its monitored processing device 110 to be able to locally throttle the power consumption of the monitored processing device 110. In this manner, the LAM circuit 136 may be configured to respond more quickly to power consumption issues caused by the current demand of the monitored processing device 110, such as di/dt events and voltage droops, before the PEL circuit 126 may be able to respond.

As an example, if the monitored processing device 110 by the LAM circuit 136 is a network node 500 of the internal communication network 114, the local throttle signals 634 generated by the LAM circuit 136 may be a throughput throttle to selectively enable and disable communication flow in the network node 500 to throttle its throughput thus throttling its power consumption. As another example, if the monitored processing device 110 by the LAM circuit 136 is a PU cluster 108(0)-108(N) or other processing device 110, the local throttle signals 634 generated by the LAM circuit 136 may be a performance throttle to selectively throttle performance or workload of the monitored PU cluster 108(0)-108(N) or other processing device 110 to throttle its performance thus throttling its power consumption.

Note that sampling of processing activity discussed herein may be accomplished by determining or sampling a quantity that is associated with an instantaneous activity of the monitored processing device 110. For example, the workload performed by a monitored processing device 100 may be determined or discoverable as an indirect method to determine instantaneous activity that can be correlated to an estimated current or power consumption. As another example, activity of a monitored processing device 110 may be determined by sensing a temperature at a temperature sensor associated with the processing device 110. As another example, a voltage droop may be sensed at the processing device 110 to determine an activity sample. Also, other quantities may be used to sample activity. As an example, an incoming interrupt at the processing device, a status register, a state of an interrupt queue, or a signal indicating whether the processing device is busy or idle may be used for sampling of processing activity.

Note that the components to perform local throttling by the LAM circuit 136 can also be provided in the LAM circuit 136R in the RAM circuit 502 so that the LAM circuit 136R may also be configured to locally throttle a monitored processing device 110.

Figure 7:
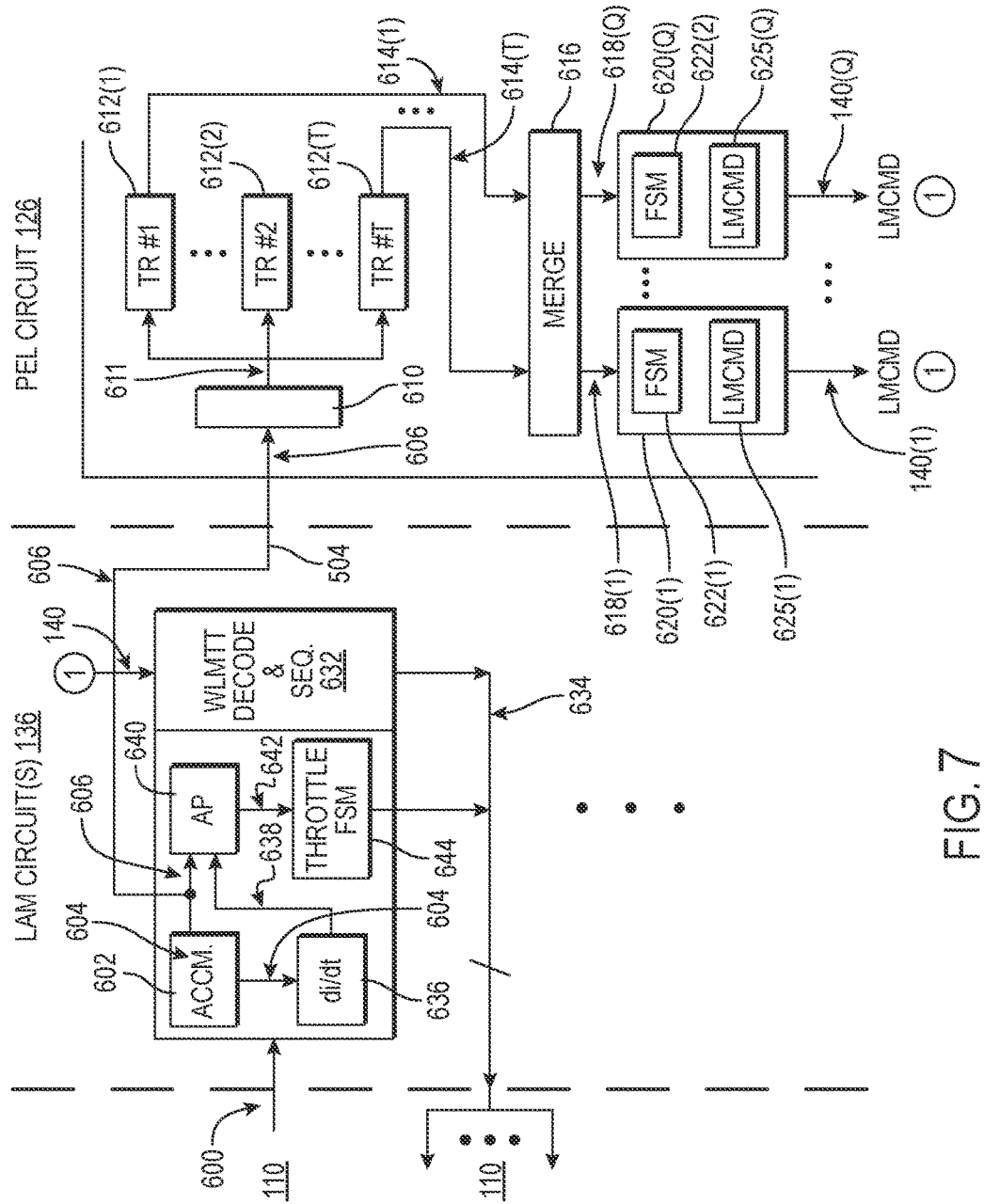
FIG. 7 is a schematic diagram of an exemplary two (2) level hierarchical power management system that can be provided in the processor-based system in the IC chip in FIG. 1, wherein two (2) level hierarchical power management systems may include: a first local level of LAM circuits configured to perform local device monitoring and power consumption throttling, and a second, centralized level of a PEL circuit configured to collect aggregated activity power events regarding power consumption of the monitored processing devices and throttle power in the IC chip in response.

Note that the hierarchical power management system 124 provided in the IC chip 104 for the processor-based system 100 in FIG. 1 is not limited to the three (3) level hierarchical power management system 624 in FIG. 6. For example, FIG. 7 is a schematic diagram of an alternative two (2) level hierarchical power management system 724 that can be provided as the hierarchical power management system 124 in the processor-based system 100 in the IC chip 104 in FIGS. 1-3 and 5. The hierarchical power management system 724 in FIG. 7 is similar to the hierarchical power management system 624 in FIG. 6, except that the intermediate RAM circuits 502 are not included in the hierarchical power management system 724 in FIG. 7. The LAM circuits 136 can be configured to provide activity power events 606 directly to the PEL circuit 126 to be processed. Common elements between the hierarchical power management system 724 in FIG. 7 and the hierarchical power management system 124 in FIGS. 1-3 and 5 are shown with common element numbers and are not re-described.

Also, as discussed herein, it is stated that the PEL circuit 126 receives activity power events 606 from a LAM circuit 136, this receipt of activity power events 606 can be directly from the LAM circuit 136 to the PEL circuit 126 or indirectly from one or more intermediate circuits, including the RAM circuits 502. For example, as discussed above, the activity power events 606 generated by the LAM circuits 136 can be indirectly reported to the PEL circuit 126 the as part of being included in aggregated activity power events 138 generated and reported by a RAM circuit 502 to the PEL circuit 126 as part of received activity power events 606.

Figure 8:
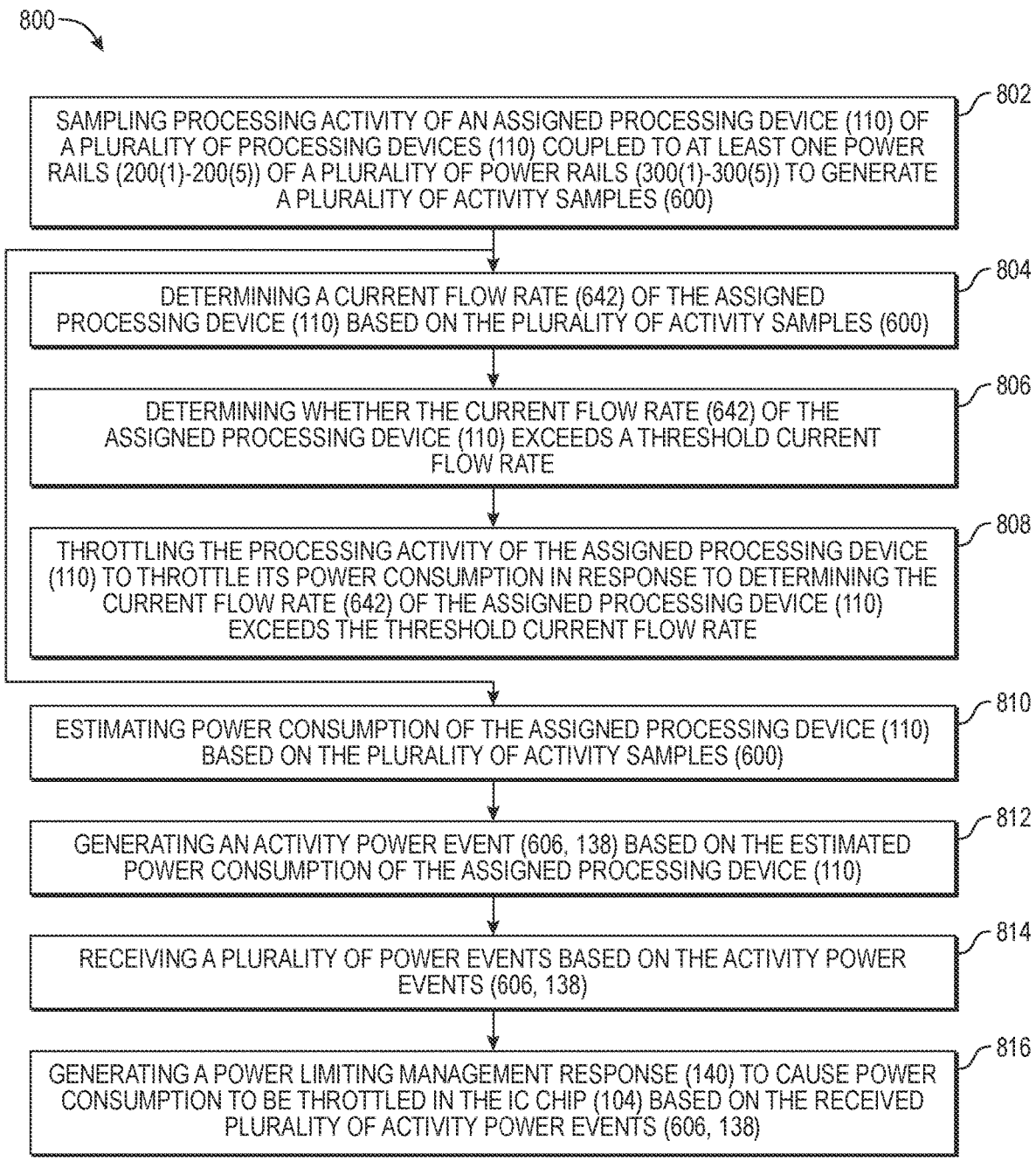
FIG. 8 is a flowchart illustrating an exemplary process of a hierarchical power management system of the processor-based system in FIG. 6, locally monitoring and throttling power consumption of monitored processing devices and hierarchically reporting activity power events related to the monitored power consumption to a PEL circuit configured to throttle power consumption in the processor-based system in response to the received power events.

FIG. 8 is a flowchart illustrating an exemplary process 800 of the LAM circuits 136 and/or the RAM circuits 502 in hierarchical power management systems 124, 624, 724 in FIGS. 1-3 and 5-7 locally monitoring and throttling power consumption of monitored processing devices 110. The process 800 also includes the hierarchically reporting activity power events 606, 138 related to the monitored power consumption by LAM circuits 136 and/or the RAM circuits 502 to throttle power consumption in the processor-based system 100 in response to the received activity power events 606, 138. The process 800 in FIG. 8 is discussed with regard to the hierarchical power management systems 624, 724 as examples.

In this regard, as shown in FIG. 8, a first step of the process 800 can be sampling processing activity of an assigned processing device 110 of a plurality of processing devices 110 coupled to at least one power rails 300(1)-300(5) of a plurality of power rails 300(1)-300(5) to generate a plurality of activity samples 600 (block 802 in FIG. 8). A next step in the process 800 can be determining a current flow rate 642 of the assigned processing device 110 based on the plurality of activity samples 600 (block 804 in FIG. 8). A next step in the process 800 can be determining whether the current flow rate 642 of the assigned processing device 110 exceeds a defined threshold current flow rate (block 806 in FIG. 8). A next step in the process 800 can be throttling the processing activity of the assigned processing device 110 to throttle its power consumption in response to determining the current flow rate 642 of the assigned processing device 110 exceeds the threshold current flow rate (block 808 in FIG. 8). Also, in addition to and/or in parallel to steps 804-808, another step in the process 800 can be estimating power consumption of the assigned processing device 110 based on the plurality of activity samples 600 (block 810 in FIG. 8). A next step in the process 800 can be generating an activity power event 606, 138 based on the estimated power consumption of the assigned processing device 110 (block 812 in FIG. 8). A next step in the process 800 can be receiving a plurality of power events based on the activity power events 606, 138 (block 814 in FIG. 8). A next step in the process 800 can be generating a power limiting management response 140 to cause power consumption to be throttled in the IC chip 104 based on the received plurality of activity power events 606, 138 (block 816 in FIG. 8).

Figure 9A:
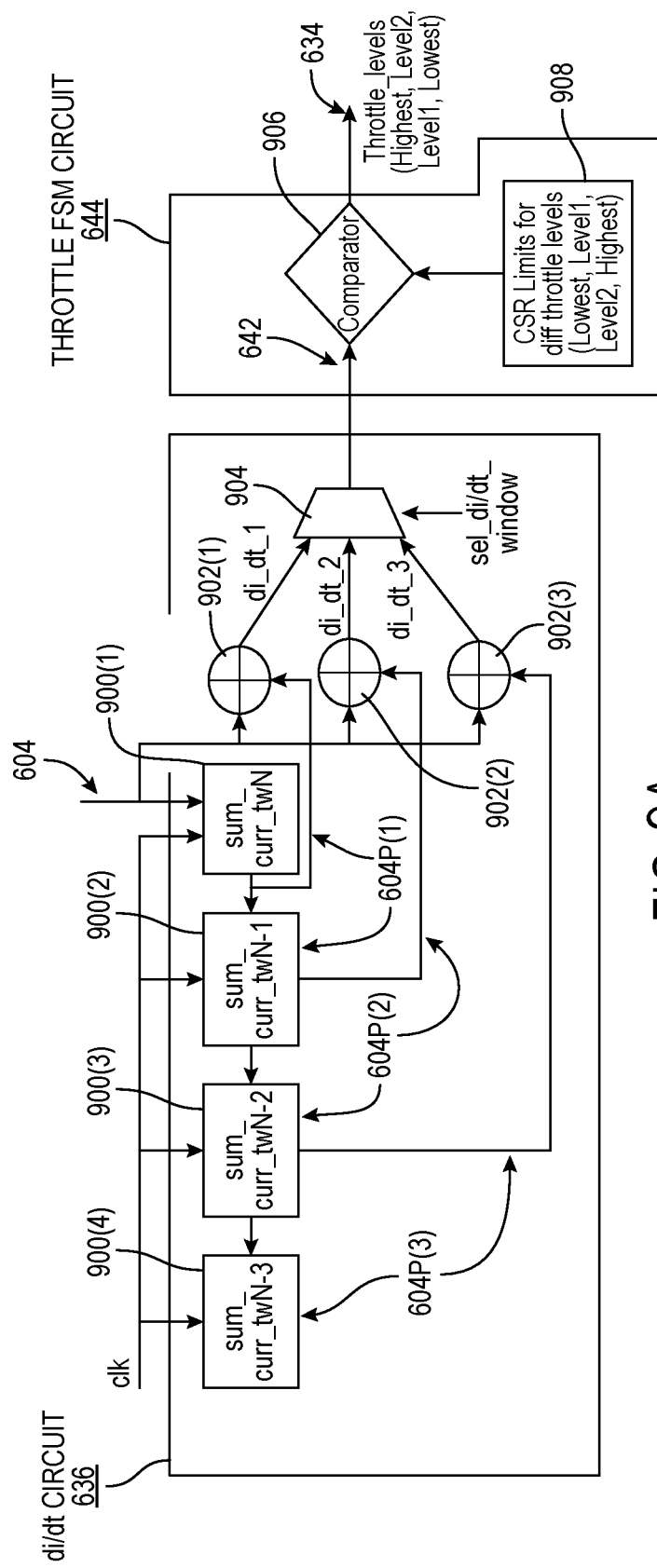
FIG. 9A is a schematic diagram illustrating an exemplary di/dt circuit that can be provided in a LAM circuit in the hierarchical power management system in FIG. 6, wherein the di/dt circuit is configured to collect activity samples of a device monitored by the LAM circuit and correlate the activity samples to estimate current and generate estimated current samples in a designated time window which can then be used to determine the slope of a rate of change in current (di/dt) consumed by the monitored processing device to determine whether the power consumption of the monitored processing device should be throttled by the LAM circuit.

FIG. 9A is a schematic diagram illustrating exemplary detail of the di/dt circuit 636 and throttle FSM circuit 644 in the LAM circuit 136 shown in FIG. 6 to collect received estimated current demands 604 for processing activity of a monitored processing device 110 over local time windows and determine if a current flow rate and/or change in current flow rate of the monitored processing device 110 exceeds a threshold. This information is used by the LAM circuit 136 to determine if its monitored processing device 110 should be locally throttled by its assigned LAM circuit 136, as previously discussed in FIG. 6.

In this regard, as shown in FIG. 9A, the di/dt circuit 636 is configured to receive next estimated current demands 604 that are generated for each local time window of the LAM circuit 136, as discussed in FIG. 6. The di/dt circuit 636 includes a plurality of latch circuits 900(1)-900(4) that are clocked circuits (e.g., flip-flops) and are configured to store the incoming next estimated current demands 604 and previously received estimated current demands 604P(1)-604P(3). Latch circuit 900(1) stores the next incoming estimated current demand 604. The next incoming estimated current demand 604 stored in the latch circuit 900(1) and the previous estimated current demands 604P(1)-604P(3) stored in the latch circuits 900(1)-900(3) are then shifted to the next respective latch circuit 900(2)-900(4) for each newly received incoming estimated current demand 604 representing a local time window. For each incoming estimated current demand 604 received representing a local time window, the incoming estimated current demand 604 and previous estimated current demands 604P(1)-604P(3) are provided to respective summing circuits 902(1)-902(4). The summing circuits 902(1)-902(3) subtract the incoming estimated current demand 604 with a respective previous estimated current demand 604P(1)-604P(3) to generate respective changes to current flow rates over local time windows (i.e., change in current flow rates) di_dt_1, di_dt_2, di_dt_3, as discussed below, of the incoming estimated current demand 604 and the respective estimated current demands 604P(1)-604P(3). Thus, the determined change in current flow rates di_dt_1, di_dt_2, di_dt_3 represent a rate in change in current flow rate or current demand and thus rate of change in power consumption of the monitored processing device 110 between the local time windows when the incoming estimated current demand 604 was received and a previous local time window of the respective previous estimated current demands 604P(1)-604P(3). di_dt_1 is the change in current or current flow rate between respective estimated current demand 604 and 604P(1). di_dt_2 is the change in current or current flow rate between respective estimated current demand 604 and 604P(2). di_dt_3 is the change in current or current flow rate between respective estimated current demand 604 and 604P(3).

Figure 9B:
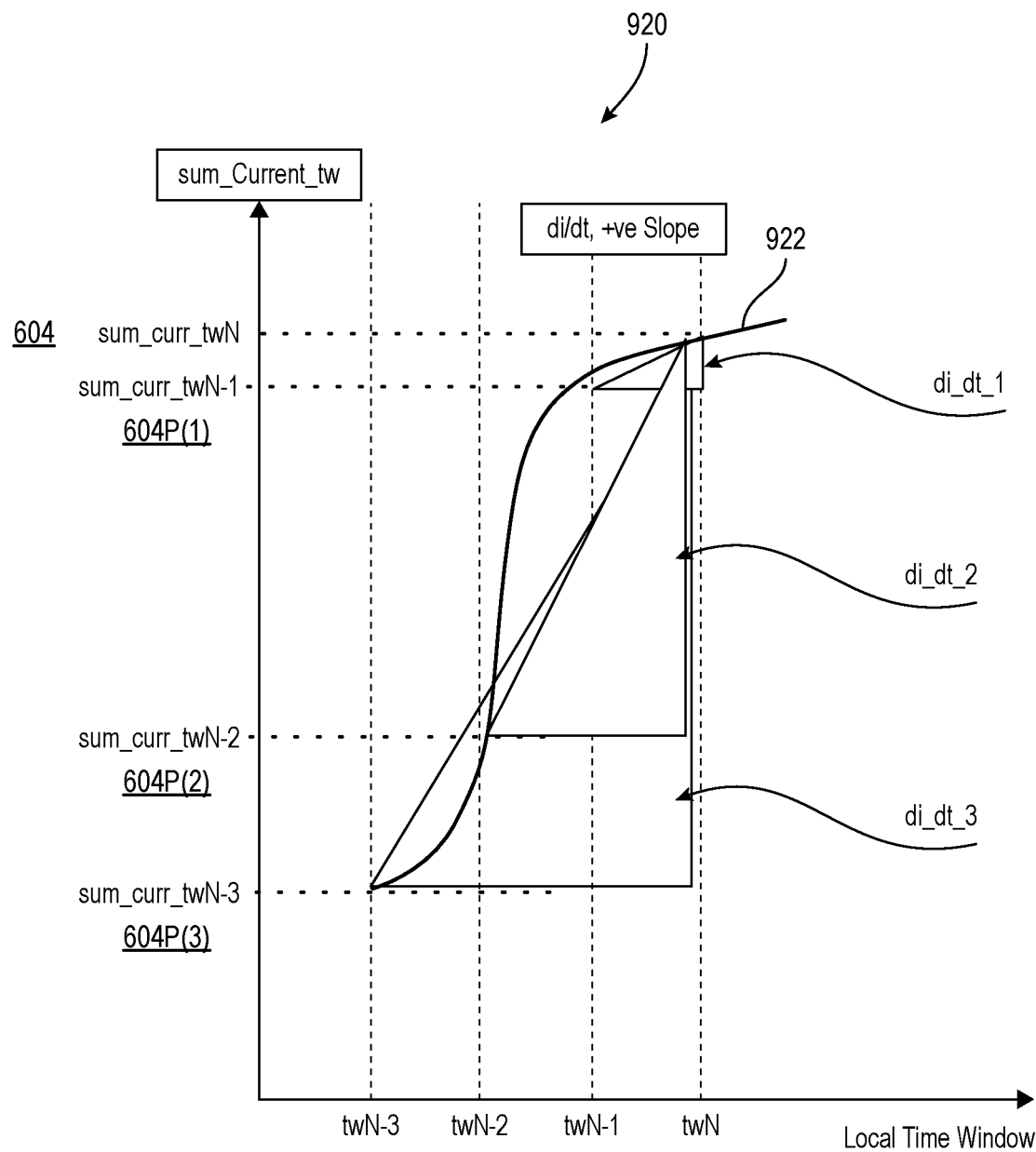
FIG. 9B is a graph illustrating exemplary estimated current samples collected by the di/dt circuit in FIG. 9A plotted as a function of time to determine the rate of change in current (di/dt) consumed by the monitored processing device.

With continuing reference to FIG. 9A, these changes in current flow rates di_dt_1, di_dt_2, di_dt_3 may then be provided to a multiplexing circuit 904 that can selectively provide one of the changes in current flow rates di_dt_1, di_dt_2, di_dt_3 as the next current flow rate 642 to a comparator circuit 906 in the throttle FSM circuit 644, discussed below. The selected change in current flow rate di_dt_1, di_dt_2, di_dt_3 provided as the next current flow rate 642 to the multiplexing circuit 904 may be based on a local time window selection signal sel_di_dt_window to select the local time windows to be compared to each current flow rate. This allows the flexibility of the di/dt circuit 636 to be programmed to select the local time windows of estimated current demands 604P(1), 604P(2) to be compared to the incoming estimated current demand 604. For example, FIG. 9B is a graph 920 illustrating exemplary incoming and estimated current demands 604, 604P(1)-604P(3) collected by the di/dt circuit 636 in FIG. 9A plotted as a function of a local time window to show how the incoming and estimated current demands 604, 604P(1)-604P(3) can be subtracted to generate respective change in current flow rates di_dt_1, di_dt_2, di_dt_3 between the incoming estimated current demand 604 and the estimated current demands 604P(1)-604P(3) over their respective local time windows twN, twN-1, twN-2, twN-3. The duration of the local time windows is known. Thus, the change in current flow rates di_dt_1, di_dt_2, di_dt_3 represent a change in current demand between the incoming estimated current demand 604 in a current local time window and a respective previous estimated current demand 604P(1)-604P(3) over the difference in their local time windows. The current flow rate curve 922 represents the current flow rate of a processing device 110 over a period of local time windows twN-3, twN-2, twN-1, and twN. As shown in FIG. 9B, the slope of the current flow rate curve 922 changes at each of the local time windows twN-3, twN-2, twN-1, and twN based on the change in current demand or change in current flow rate demanded of the processing device 110 between local time windows twN-3, twN-2, twN-1, and twN. FIG. 9B shows the basis on which the di/dt circuit 636 in FIG. 9A can generate the change in current flow rates di_dt_1, di_dt_2, di_dt_3 representing a change in current demand between the incoming estimated current demand 604 in a current local time window and a respective previous estimated current demand 604P(1)-604P(3) over the difference in their local time windows twN-3, twN-2, twN-1, and twN. This can be used to provide the current flow rate 642 of the processing device 110 to use to determine local power consumption throttling.

The selected next current flow rate 642 is provided by the di/dt circuit 636 to the comparator circuit 906 in the throttle FSM circuit 644. The throttle FSM circuit 644 may be configured to generate the local throttle signals 634 to throttle power consumption of the monitored processing device 110 based on whether the selected next current flow rate 642 (from selection of change in current flow rate di_dt_1, di_dt_2, di_dt_3) exceeds a threshold current flow rate (which can include a threshold change in current flow rate) for the monitored processing device 110. The threshold current flow rate for the monitored processing device 110 can be obtained from a current flow rate register 908. The current flow rate register 908 can be programmed with a threshold current flow rate for the monitored processing device 110. For example, the current flow rate register 908 can be programmed with different threshold current flow rates (e.g., lowest, level 1, level 2, highest) so that the comparator circuit 906 can generate local throttle signals 634 for different levels of power consumption throttling based on the comparison of selected next current flow rate 642 (from selection of change in current flow rate di_dt_1, di_dt_2, di_dt_3) with the selected threshold current flow rate obtained from the current flow rate register 908.

Note that when current flow rate is discussed herein, such also means current flow and represents current (I) (e.g., charge (q) over time (t) (q/t)) or a change in the current flow rate (e.g., a change in current over time (di/dt)). A determined change in the current flow rate (di/dt) is determined from a determined current flow rate (t/T).

Figure 10:
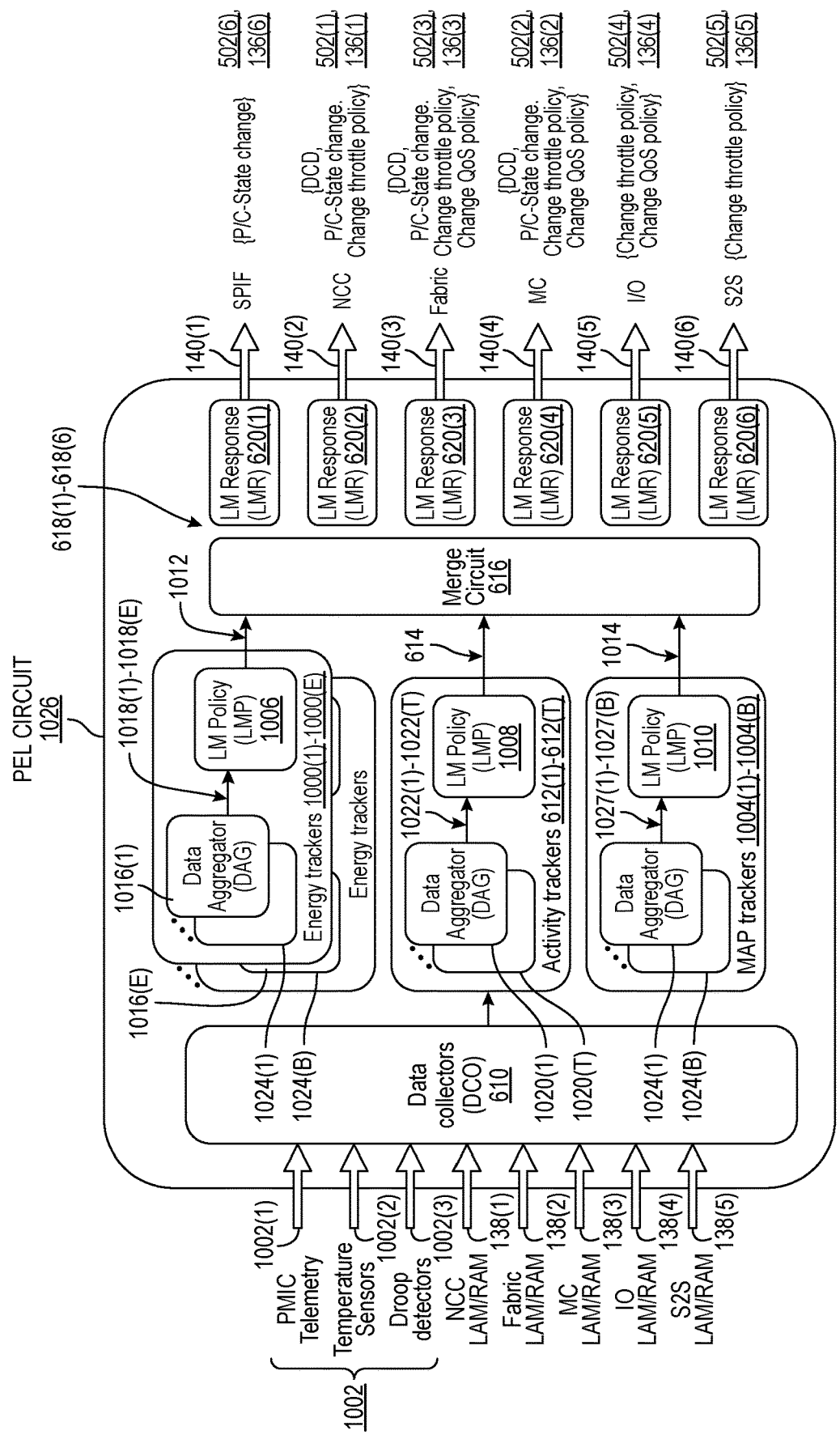
FIG. 10 is a logic diagram of an exemplary PEL circuit that can be provided in a hierarchical power management system of the processor-based system and that illustrates exemplary components for receiving power events, decoding the received power events in tracking circuits, and merging the tracked power events to generate a power limiting management responses to throttle power consumption in the processor-based system in response to the received power events.

The components of the hierarchical power management systems 124, 624, 724 in FIGS. 1-3 and 5-7 described above can be provided in different implementations. For example, FIG. 10 is a logic diagram of another exemplary PEL circuit 1026 that can be any of PEL circuits 126 provided in the hierarchical power management system 124, 624, 724 in FIGS. 1-3 and 5-7. Common elements between the PEL circuit 1026 in FIG. 10 and the PEL circuit 126 in the hierarchical power management system 124, 624, 724 in FIGS. 1-3 and 5-7 are shown with common element numbers.

In another example of the components of the hierarchical power management systems 124, 624, 724 in FIGS. 1-3 and 5-7 described above, FIG. 10 shows the PEL circuit 1026 configured to receive the aggregated activity power events 138(1)-138(5) from the one or more RAM circuits 502. The PEL circuit 1026 can be the PEL circuit 126 provided in the hierarchical power management system 124, 624, 724 in FIGS. 1-3 and 5-7. In this example, the PEL circuit 1026 includes the decode circuit 610 that is configured to decode the received aggregated activity power events 138(1)-138(5) into the corresponding activity tracker circuit 612(1)-612(T) as previously described. The PEL circuit 1026 in this example also includes energy tracker circuits 1000(1)-1000(E) that are associated with energy power events 1002, such as PMIC telemetry power events 1002(1), temperature events 1002(2), and voltage droop detection events 1002(3) (all of which are examples of non-activity power events), that can also affect how the PEL circuit 1026 decides to throttle power. The PEL circuit 1026 in this example also includes maximum average power (MAP) tracker circuits 1004(1)-1004(B), which are circuit trackers that track the total power consumed in the SoC 120 according to a defined maximum power consumption limit. Similar to the activity tracker circuits 612(1)-612(T), the energy tracker circuits 1000(1)-1000(E) and the MAP tracker circuits 1004(1)-1004 (B) are configured to respective energy power events 1002 (1)-1002(3) and/or aggregated activity power events 138(1)-138(5) to determine whether a factor exists that is dependent on power consumption that exceeds a defined power (e.g., current) threshold/limit.

The energy tracker circuits 1000(1)-1000(E) may each include respective data aggregator circuits 1016(1)-1016(E) that are configured to aggregate the received energy power events 1002 into respective aggregated energy power events 1018(1)-1018(E). The activity tracker circuits 612(1)-612 (T) may also each include respective data aggregator circuits 1020(1)-1020(T) that are configured to aggregate received energy power events into respective aggregated energy power events 1022(1)-1022(T). The MAP tracker circuits 1004(1)-1004(B) may also each include respective data aggregator circuits 1024(1)-1024(T) that are configured to aggregate received energy power events into respective aggregated MAP power events 1027(1)-1027(B). The energy tracker circuits 1000(1)-1000(E), the activity tracker circuits 612(1)-612(T), and the MAP tracker circuits 1004 (1)-1004(B) in this example, each include a respective energy power limit management policy circuits 1006, activity power limit management policy circuits 1008, and MAP power limit management policy circuits 1010 that are configured to generate respective energy power throttle recommendations 1012, activity power throttle recommendations 614, and MAP power throttle recommendations 1014. These generated respective energy power throttle recommendations 1012, activity power throttle recommendations 614, and MAP power throttle recommendations 1014 may be based on the respective received aggregated energy power events 1018(1)-1018(E), aggregated activity power events, 1022(1)-1022(T), aggregated MAP power events 1027(1)-1027(B) for the PEL circuit 1026 to process to determine how to throttle power consumption in the IC chip 104.

With continuing reference to FIG. 10, the energy tracker circuits 1000(1)-1000(E), the activity tracker circuits 612 (1)-612(T), and the MAP tracker circuits 1004(1)-1004(B) are configured to compare a power consumption indicated by the respective aggregated energy power events 1018(1)-1018(E), aggregated activity power events 1022(1)-1022(T), and aggregated MAP power events 1027(1)-1027(B), to the respective energy power limit management policy circuits 1006, activity power limit management policy circuits 1008, and MAP power limit management policy circuits 1010 energy tracker circuits 1000(1)-1000(E), the activity tracker circuits 612(1)-612(T), and the MAP tracker circuits 1004 (1)-1004(B). The energy tracker circuits 1000(1)-1000(E), the activity tracker circuits 612(1)-612(T), and the MAP tracker circuits 1004(1)-1004(B) may then be configured to generate the respective energy power throttle recommendations 1012, activity power throttle recommendations 614, and MAP power throttle recommendations 1014 based on the comparison of the power consumptions indicated by the respective aggregated power events 1018(1)-1018(E), 1022 (1)-1022(T), 1027(1)-1027(B) to the respective power limit management policy circuits 1006, 1008, 1010. For example, the energy power limit management policy circuits 1006, the activity power limit management policy circuits 1008, and the MAP limiting management policy circuits 1010 may each have respective a threshold power consumption that is compared to the respective aggregated power events 1018 (1)-1018(E), 1022(1)-1022(T), 1027(1)-1027(B) to determine the respective power throttle recommendations 1012, 614, 1014.

With continuing reference to FIG. 10, the PEL circuit 1026 also includes the merge circuit 616 that merges the energy power throttle recommendations 1012, generates respective activity power throttle recommendations 614, and MAP power throttle recommendations 1014 into merged power throttle recommendations 618(1)-618(6). The merged power throttle recommendations 618(1)-618(6) are provided to respective assigned target circuits 620(1)-620(6). Note that each merged power throttle recommendation 618(1)-618(6) can be influenced by power throttle recommendations from each of the energy power throttle recommendations 1012, generate respective activity power throttle recommendations 614, and MAP power throttle recommendations 1014. Each target circuit 620(1)-620(6) is associated with a different target device 200 in the processor-based system 100 in which the PEL circuit 1026 can issue power limiting management responses 140(1)-140(6) to limit the power consumption of such target device 200.

The target devices 200 can include the interface circuits 127(1)-127(Z) that can be throttled by power limiting management responses 140(1) communicated to a RAM circuit 502(6) and/or LAM circuit 136(6) configured to throttle power consumption in such interface circuits 127(1)-127(Z). The target devices 200 can include the PU clusters 108(0)-108(N) that can be throttled by power limiting management responses 140(2) communicated to a RAM circuit 502(1) and/or LAM circuit 136(1) configured to throttle power consumption in such PU clusters 108(0)-108(N). The target devices 200 can include the internal communication network 114 that can be throttled by power limiting management responses 140(3) communicated to a RAM circuit 502(3) and/or LAM circuit 136(3) configured to throttle power consumption in such internal communication network 114. The target devices 200 can include the memory controllers 118(0)-118(M) that can be throttled by power limiting management responses 140(4) communicated to a RAM circuit 502(2) and/or LAM circuit 136(2) configured to throttle power consumption in such memory controllers 118(0)-118(M). The target devices 200 can include the I/O interface circuits 120(0)-120(X) that can be throttled by power limiting management responses 140(5) communicated to a RAM circuit 502(4) and/or LAM circuit 136(4) configured to throttle power consumption in such I/O interface circuits 120(0)-120(X). The target devices 200 can include the S2S interface circuits 122(0)-122(Y) that can be throttled by power limiting management responses 140(6) communicated to a RAM circuit 502(5) and/or LAM circuit 136(5) configured to throttle power consumption in such S2S interface circuits 122(0)-122(Y).

The merge circuit 616 in the PEL circuit 1026 can be programmed to map (e.g., through firmware, electronic fuses, etc.) merged power throttle recommendations 618(1)-618(6) to a particular target device 200, and thus a target circuit 620(1)-620(6), that may not directly correlate to each other. In this manner, the merged power throttle recommendations 618(1)-618(6) related to power issues and power consumption in the IC chip 104 can be mapped in the PEL circuit 1026 to correlate to different target devices 200 for throttling power consumption. The merge circuit 616 can be programmed in a "many-to-many mapping" to correlate to different power-limiting management responses within the IC chip 104 in the desired manner for more flexibility in managing power consumption in the IC chip 104 while still achieving the desired performance. In this manner, the power throttling management behavior of the PEL circuit 1026 can be configured and changed even after the IC chip 104 is deployed in an application.

With continuing reference to FIG. 10, the target circuits 620(1)-620(6) may each be configured to determine if the power consumption of an associated target device 200 in the processor-based system 100 should be throttled based on the merged power throttle recommendations 618(1)-618(6) provided to the target circuits 620(1)-620(6). The target circuits 620(1)-620(6) may each be configured to analyze the respectively received merged power throttle recommendation 618(1)-618(6) to determine if the power consumption of an associated target device 200 should be throttled. If a target circuit 620(1)-620(Q) determines that the power consumption of an associated target device 200 in the processor-based system 100 should be throttled, the target circuit 620(1)-620(Q) causes an associated power limiting management response 140(1)-140(6) to be generated to be communicated to a respective RAM circuit 502(1)-502(6) and/or LAM circuit 136(1)-136(6) cause the power consumption of a target device 200 associated with the power limiting management response 140(1)-140(Q) to limit power consumption.

Figure 11:
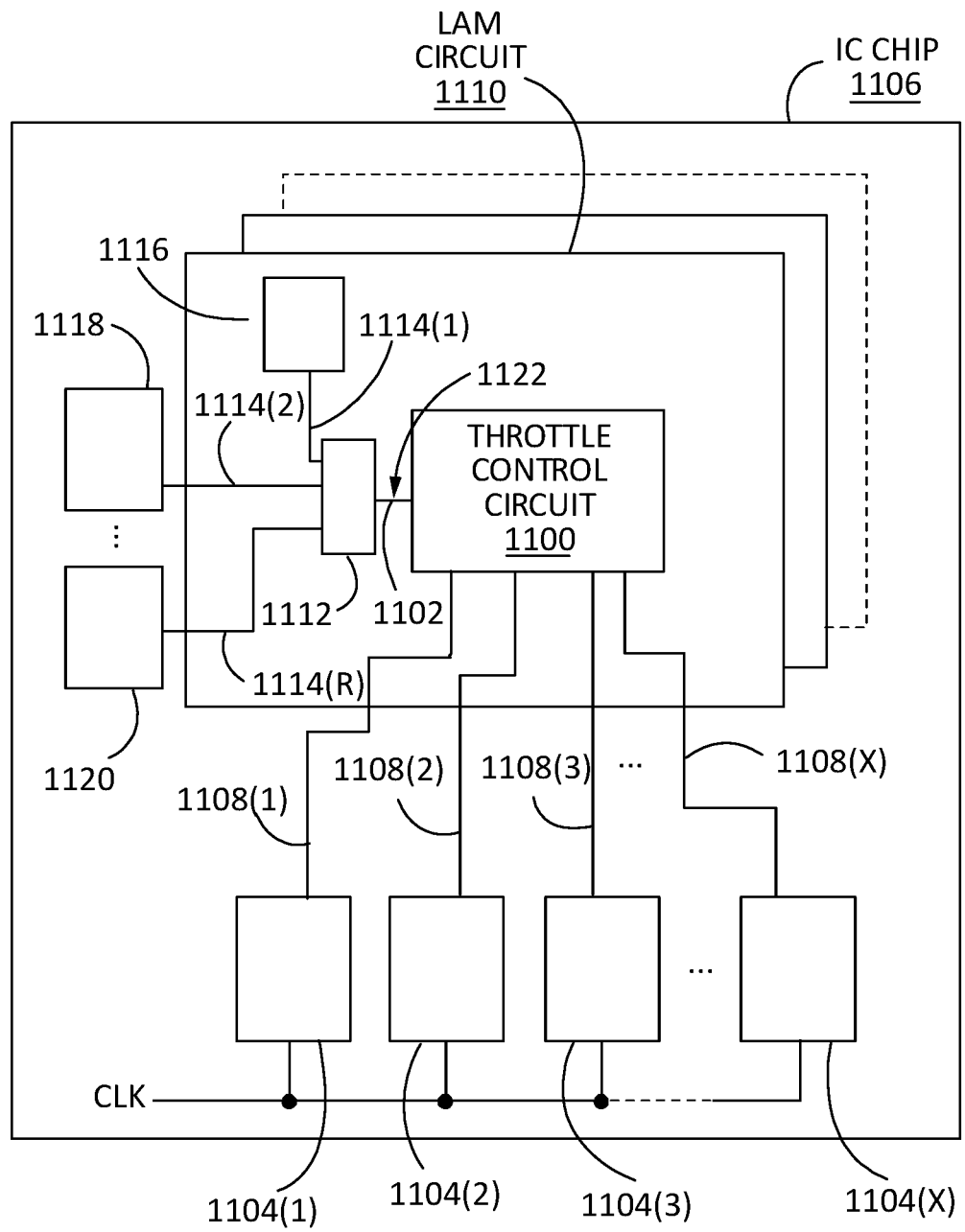
FIG. 11 is a block diagram of an exemplary throttle control circuit in a processor-based system configured to receive a throttle control signal and provide, to a plurality of processing segment circuits, selected activity control signals to control activity in a clock window of N consecutive clock cycles, including throttling activity in a number M of the N consecutive cycles based on the throttle control signal.

The components of a power management system, such as hierarchical power management systems 124, 624, 724 in FIGS. 1-3 and 5-7 described above, can be provided in different implementations, including circuits that implement throttling locally. As an example, FIG. 11 is a block diagram of an exemplary throttle control circuit 1100 configured to receive a throttle control signal 1102 for controlling power in processing segment circuits 1104(1)-1104(X) in an IC chip 1106. The throttle control circuit 1100 provides, to the processing segment circuits 1104(1)-1104(X) in a number (N) of consecutive cycles of a clock signal CLK, selected activity control signals 1108(1)-1108(X) configured to throttle activity in a number (M) of the cycles in the window, where the number M may vary among the processing segment circuits 1104(1)-1104(X). Each processing segment circuit 1104(1)-1104(X) is a segment of the processing circuits associated with a LAM circuit 1110 that may be separately throttled by the throttle control circuit 1100. Each of the processing segment circuits 1104(1)-1104(X) operates in response to the clock signal CLK, which is a periodic clock employed to synchronize state changes in the IC chip 1106. Herein, "operation" of the processing segment circuits 1104(1)-1104(X) refers to state change activity and/or switch activity in sequential circuits in response to the clock signal CLK.

The throttle control circuit 1100 may be included in the LAM circuit 1110, which may be any of the LAM circuits 136 in FIG. 1, 2, or 5. The throttle control signal 1102 may be generated in a throttle request accumulate circuit 1112 based on throttle requests 1114(1)-1114(R) generated circuits for monitoring power-related events and conditions. For example, the throttle requests 1114(1)-1114(R) may be generated in a di/dt circuit 1116 in the LAM circuit 1110, a temperature sensor 1118 that is located near the LAM circuit 1110, and/or in one or more additional monitoring circuits 1120 that monitor an indication of power consumption. For example, the monitoring circuits 1120 may provide a throttle request based on any of firmware instructions, current events or conditions, power events or conditions, and activity events or conditions. The di/dt circuit 1116 and the temperature sensor 1118 may be the di/dt circuit 636 in FIG. 6 and the temperature sensor 132 in FIG. 2. The throttle control signal 1102 based on the throttle requests 1114(1)-1114(R) indicates a throttle control value 1122 that may be any of N values based on the throttle requests 1114(1)-114(R). The throttle requests 1114(1)-1114(R) may vary according to any of rate of change of current, temperature, level of detected activity, etc.

Each processing segment circuit 1104(1)-1104(X) includes at least one transistor circuit configured to change an output voltage state in response to the clock signal CLK. The processing segment circuits 1104(1)-1104(X) associated with the LAM circuit 1110 may each be located adjacent to another one of the processing segment circuits 1104(1)-1104(X) and may each be coupled to a same power rail to receive a power supply voltage.

The purpose of the throttle control circuit 1100 in this example is to provide local control or throttling of activity in the processing segment circuits 1104(1)-1104(X) associated with the LAM circuit 1110. Activity in the processing segment circuits 1104(1)-1104(X) refers to state changes or changes in a voltage state on the outputs of sequential circuits that occur in response to the clock signal CLK. For example, the voltage level on outputs of storage circuits, including memory circuits, latch circuits, and/or flip-flop circuits among the processing segment circuits 1104(1)-1104(X), may change state (e.g., switch) in response to a voltage or a change in voltage (e.g., a level, transition or edge) of the clock signal CLK. Such state changes cause a surge in current in the power rail(s), providing a power supply voltage to the processing segment circuits 1104(1)-1104(X). The number of circuits that switch in response to the clock signal CLK at a given moment varies depending on circumstances, such as a type of instructions being executed, a frequency of executing instructions, the data being processed, and other factors. As a result, the current and power requirements vary. Circuits can be provided to monitor current and power in an area local to the LAM circuit 1110 by detecting electrical characteristics such as current level, rate of change of current (di/dt), power level, rate of change of power consumption, or temperature. Current and power can also be measured indirectly by monitoring processing activity, such as by firmware. When these monitoring circuits determine, based on the particular aspect of current or power states or events that they measure, that the amount of activity in the processing segment circuits 1104(1)-1104(X) should be reduced, they can generate one of the threshold requests 1114(1)-1114(R), which are the throttle requests 1114(1)-1114(R) from FIG. 11. The throttle request accumulate circuit 1112 receives the throttle requests 1114(1)-1114(R) and generates the throttle control signal 1102 based on a predetermined algorithm or voting method.

Stopping all activity in the processing segment circuits 1104(1)-1104(X) would be an extreme and unnecessary response to a minor di/dt event, for example. For a more appropriate response, the throttle requests 1114(1)-1114(R) each provide one of several values in a range to indicate, based on the severity of the problem detected (e.g., event or condition), an appropriate request for a reduction in activity. Consequently, the throttle control signal 1102 is a value based on the respective throttle requests. A reduction of activity in the processing segment circuits 1104(1)-1104(X) can be achieved by reducing the number of cycles within a window of consecutive cycles (clock window) of the clock signal CLK, in which switching or state changes are allowed (enabled) to occur. Maximum power is consumed when switching is enabled in all (100 percent) of the cycles of the clock signal CLK. In a clock window including a number (N) of consecutive cycles of the clock signal CLK, activity can be reduced in the processing segment circuits 1104(1)-1104(X) incrementally by reducing the number of cycles in which activity is enabled from N to 1. Thus, the number of possible values of the throttle control signal 1102 may equal to the number N of consecutive cycles in a clock cycle window of the clock cycle.

However, not all of the processing segment circuits 1104(1)-1104(X) may be identical in power consumption characteristics, as individual ones may perform different functions and therefore consume different amounts of power or may cause different rates of increase and/or decrease in current drawn on the power rail(s). In this regard, equally reducing the number of cycles of activity in all of the processing segment circuits 1104(1)-1104(X) may not be necessary or desirable to achieve the desired change in the power distribution. In addition, performance can be optimized for each incremental level of requested throttle reduction by varying the extent to which activity is reduced among the processing segment circuits 1104(1)-1104(X) in a configurable manner. Such configuration may be based on testing and programming of the IC chip 1106.

Figure 12:
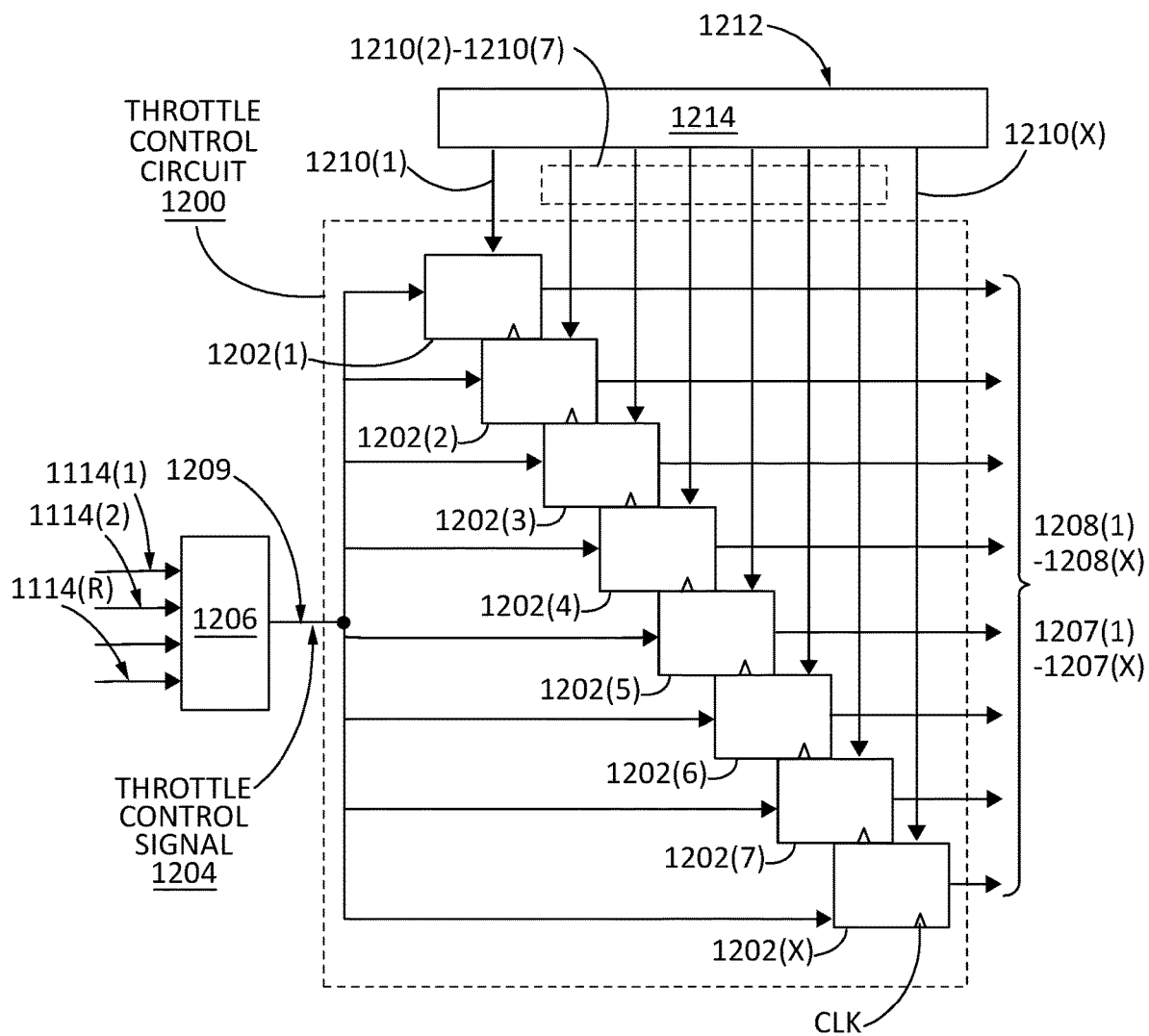
FIG. 12 is a block diagram of a throttle control circuit including a plurality of throttle administration circuits, each configured to receive the throttle control signal and generate a throttle select signal corresponding to one of the plurality of processing segment circuits.

FIG. 12 is a block diagram of a throttle control circuit 1200, including a plurality of throttle administration circuits 1202(1)-1202(X), each configured to receive a throttle control signal 1204 from a throttle request accumulate circuit 1206. The throttle administration circuits 1202(1)-1202(X) each generate one of throttle select signals 1208(1)-1208(X) corresponding to one of the plurality of processing segment circuits 1104(1)-1104(X) in FIG. 11. The throttle select signals 1208(1)-1208(X) have corresponding throttle select values 1207(1)-1207(X) that may each be set to one of N possible values based on the throttle control values 1209 of the throttle control signal 1204 and also based on a corresponding one of throttle configuration signals 1210(1)-1210(X). In this example, the throttle configuration signals 1210(1)-1210(X) are generated from configuration information 1212 stored in a configuration register 1214.

Implementation of an optimized incremental approach to activity reduction in the processing segment circuits 1104(1)-1104(X) includes storing individualized configuration information 1212 for each of the processing segment circuits 1104(1)-1104(X) in the configuration register 1214 for each incremental change in the throttle control value 1209 designated by the throttle control signal 1204. Receiving both the throttle control value 1209 and the configuration information 1212, the throttle administration circuits 1202(1)-1202(X) generate selections of appropriate levels of activity for each one of the processing segment circuits 1104(1)-1104(X). The throttle administration circuit 1202(1)-1202(X) is configured to, for a given throttle control value 1209, determine the number of cycles, among the first number (N) of cycles, that activity in a corresponding one of the processing segment circuits 1104(1)-1104(X) is disabled based on the configuration information 1212.

In a further aspect, while some of the throttle requests 1114(1)-1114(R) are based on measures (e.g., of events or conditions) that change slowly, others may be based on measures that can change significantly from cycle to cycle. In addition, one of the benefits of locally applied throttle control is the ability to respond to detected problems quickly. Therefore, the throttle control circuit 1200 is configured to respond in a next cycle of the clock signal CLK to request a significant reduction in activity in the processing segment circuits 1104(1)-1104(X). On the other hand, sudden increases in activity in the processing segment circuits 1104(1)-1104(X) can cause sudden increases in current that may result in a voltage droop, for example. Consequently, even if the throttle control signal 1204 indicates that a significant increase in activity is allowed, the throttle administration circuits 1202(1)-1202(X) may not allow a significant increase to occur during one or a few cycles. Rather, to avoid sudden increases in current and power, the throttle administration circuits 1202(1)-1202(X) may be implemented as finite state machines, referred to collectively as FSMs 1202. The FMSs 1202 can gradually increase activity in the corresponding processing segment circuits 1104(1)-1104(X) at a configurable rate. In view of the above considerations, the throttle administration circuits 1202(1)-1202(X) generate the throttle select signals 1208(1)-1208(X) that are each directed to one of the processing segment circuits 1104(1)-1104(X). The throttle select values 1207(1)-1207(N) of the throttle select signals 1208(1)-1208(X) are based on the most recent throttle control value 1209, the configuration information 1212 indicating the appropriate activity level for the corresponding one of the processing segment circuits 1104(1)-1104(X) at that throttle control value 1209, and a transition limitation imposed by the FSM limiting the number of states by which the FSM 1202 can change in one direction. The throttle select signals 1208(1)-1208(X) are provided to a throttle sequence selection circuit shown in FIG. 13. Detailed operations of the throttle administration circuits 1202(1)-1202(X) is described in more detail with reference to FIG. 15 below.

Figure 13:
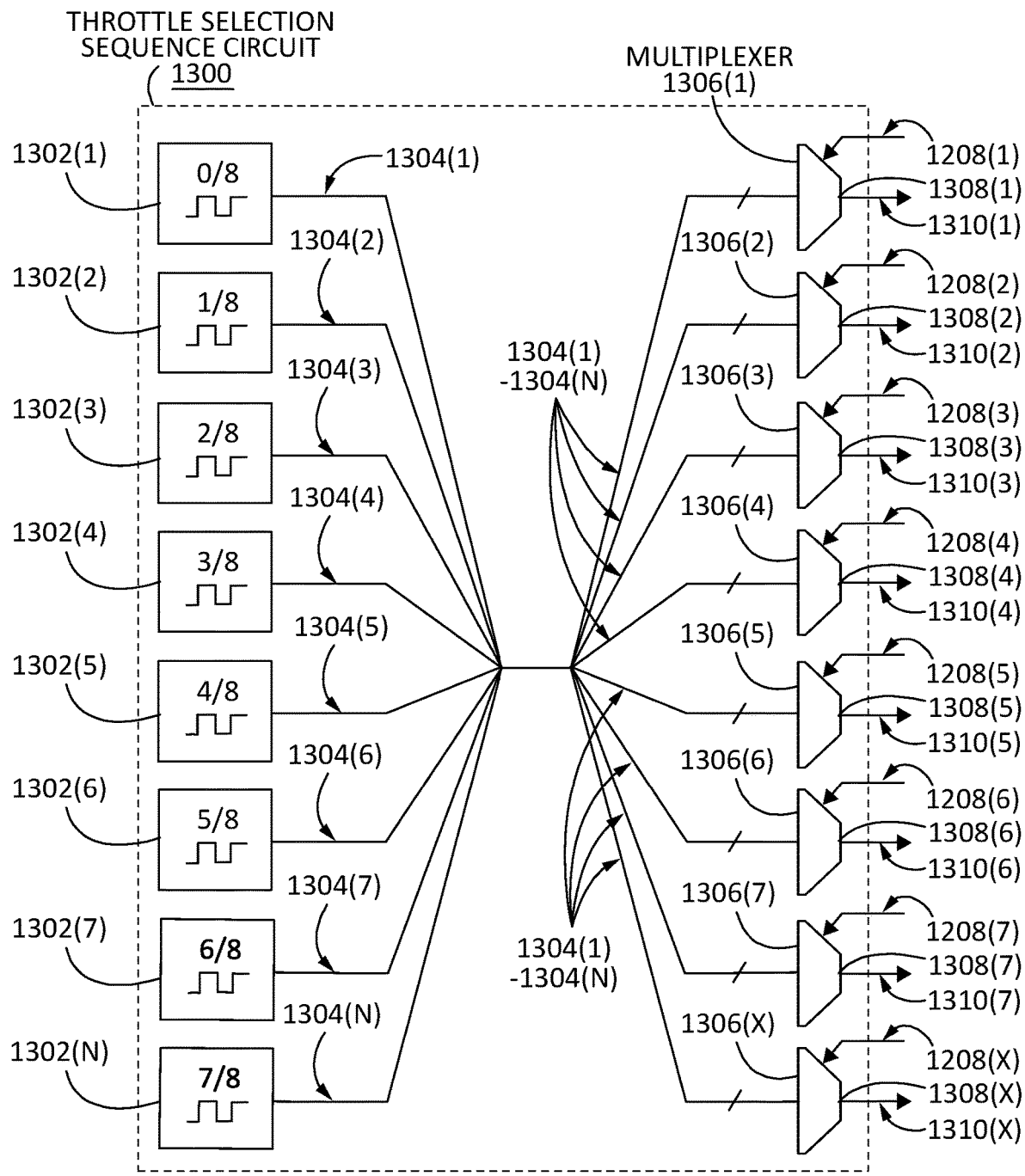
FIG. 13 is a block diagram showing details of a throttle sequence selection circuit configured to receive throttle select signals corresponding to each of the plurality of processing segment circuits and provide a selected activity control signal to the processing segment circuit.

FIG. 13 is a block diagram showing details of a throttle sequence selection circuit 1300 configured to receive the throttle select signals 1208(1)-1208(X) in FIG. 12 corresponding to each of the plurality of processing segment circuits 1104(1)-1104(X) in FIG. 11. As noted above, the level of activity in a cycle window of N consecutive cycles can be in the range from N active cycles with no inactive cycles to one (1) active cycle (with N−1 inactive cycles). The throttle sequence selection circuit 1300 includes throttle sequence generators 1302(1)-1302(N) that each generate sequence signals 1304(1)-1304(N) that repeat every N cycles, where each of the sequence signals 1304(1)-1304(N) is in a first state for M cycles and in a second state for N-M cycles, where M ranges from zero (0) to N−1.

In an example in which the clock window is eight (8) consecutive cycles (i.e., N=8), the value of M ranges from zero (0) to seven (7). In such an example, the throttle sequence generator 1302(1) may generate a sequence in which the sequence signal 1304(1) is in a first state (e.g., "0" or "1") for M=1 cycle and a second state (e.g., "1" or "0") for N−M or 8−1=7 cycles. Here, the first state is provided to enable (allow) activity in the processing segment circuits 1104(1)-1104(X), and the second state is provided to disable activity. In additional examples, the throttle sequence generator 1302(3) may generate a sequence signal 1304(3) that is in a first state for 3 cycles and a second state for 5 cycles, and the throttle sequence generator 1302(8) may generate a sequence signal 1304(8) that is in the first state for 8 cycles and the second state for 0 cycles. As should be apparent, the sequence signal 1304(8) is provided to any of the processing segment circuits 1104(1)-1104(X) in which no throttling or reduction in activity is requested, and the sequence signal 1304(1) is provided for the most restrictive throttling response, allowing only one active cycle per cycle window.

The throttle sequence selection circuit 1300 includes multiplexors 1306(1)-1306(X), each corresponding to one of the processing segment circuits 1104(1)-1104(X). Each of the sequence signals 1304(1)-1304(N) is provided to each of the multiplexors 1306(1)-1306(N). The throttle select signals 1208(1)-1208(X) generated in the throttle administration circuits 1202(1)-1202(X) in FIG. 12 are employed by the multiplexors 1306(1)-1306(N) to select, for each of the processing segment circuits 1104(1)-1104(X), a corresponding one of sequence signals 1304(1)-1304(N) to throttle activity. Selected ones of the sequence signals 1304(1)-1304(N) are provided on outputs 1308(1)-1308(X) as activity control signals 1310(1)-1310(X), which are provided to the corresponding processing segment circuit 1104(1)-1104(X).

It can easily be recognized that the number N of throttle sequence generators 1302(1)-1302(N) in this example is determined by the number of different sequences that can be provided, which, in this case, corresponds to the number N of cycles in the clock window in the examples above. In another non-limiting example, rather than providing sequence signals 1304(1)-1304(N) having each increment from 1 to N active cycles, throttle sequence generator 1302(1)-1302(N/2) generating sequence signals 1304(1)-1304(N/2) having only even numbers of active cycles (e.g., 2, 4, 6, and 8) may be employed. In such a case, for a cycle window having 8 cycles, only four (4) throttle sequence generators may be needed. Other cases, including odd numbers of active cycles or any combination of active and inactive signals are also possible.

The number X of throttle administration circuits 1202(1)-1202(X) in FIG. 12 is determined by a maximum number of the processing segment circuits 1104(1)-1104(X) that can be controlled by the throttle control circuit 1100. Although the number X of throttle administration circuits 1202(1)-1202(X) in the throttle control circuit 1100 may be greater than or less than the actual number of separately controlled processing segment circuits 1104(1)-1104(X), it is the same number in this example. The number X of multiplexors 1306(1)-1306(X) corresponds to the number of the throttle administration circuits 1202(1)-1202(X), where each multiplexor is controlled by a corresponding one of the throttle administration circuits 1202(1)-1202(X). In the example in FIG. 13, although the number N of throttle sequence generators 1302(1)-1302(N) and the number X of multiplexors 1306(1)-1306(X) are equal (i.e., 8), it should be recognized that this is merely coincidental as the number N of throttle control values 1209 and the number X of separately controlled processing segment circuits 1104(1)-1104(X) are independent of each other. The plurality of throttle sequence generators 1302(1)-1302(N) generate the select signals 1304(1)-1304(N) to disable every number, from 0 to N−1, of the cycles of the N consecutive cycles in a clock window. Thus, in response to a highest possible throttle control value 1209, the FSMs 1202 are configured to provide activity control signals 1306(1)-1304(X) to (depending on configuration information 1212) disable activity in the processing segment circuits 1104(1)-1104(X) in all but one of the cycles of the consecutive cycles of the clock window. In response to a lowest throttle control value 1209, the FSMs 1202 are configured to provide an activity control signal 1306(1)-1306(X) that does not disable activity in any of the cycles of the consecutive cycles of the clock window.

Figure 14:
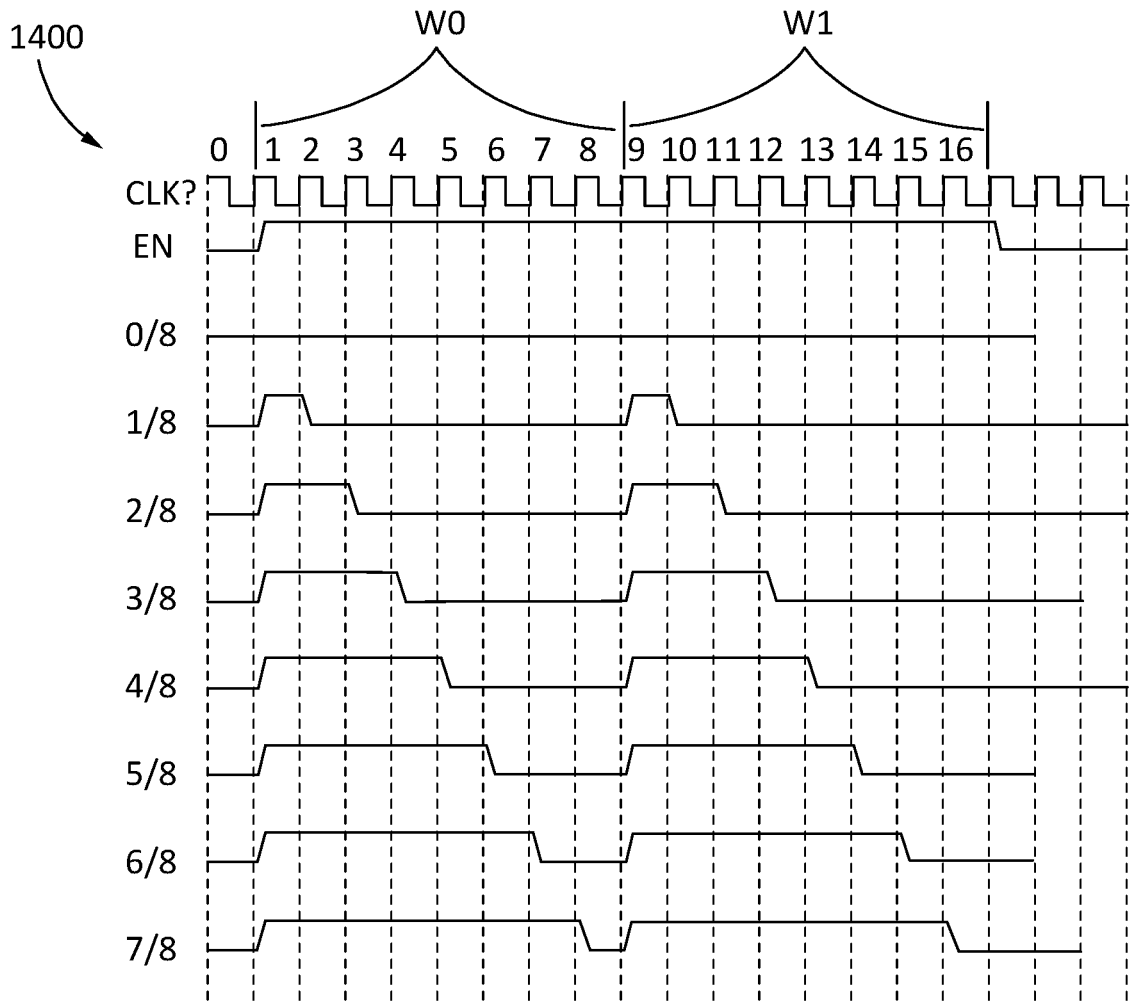
FIG. 14 is a timing diagram illustrating sequence signals that are generated by throttle sequence generators and provided as activity control signals to throttle activity in processing segment circuits in different numbers of cycles of the cycle window of N consecutive cycles.

FIG. 14 is a timing diagram 1400 illustrating the sequence signals 1304(1)-1304(N) that are generated by the throttle sequence generators 1302(1)-1302(N) and provided to disable activity (e.g., state changes) in a processing segment circuits 1104(1)-1104(X) in different numbers of cycles of the cycle window of N consecutive cycles. Time proceeds from left to right in timing diagram 1400.

The sequence signals 1304(1)-1304(N) are labeled in FIG. 14 based on their respective numbers of cycles in which activity is disabled. Referring to the description above, sequence signal 1304(1) (e.g., M=1) is designated "7/8" because this signal causes activity to be disabled in 7 cycles of the 8-cycle clock window. The sequence signal 1304(3) (e.g., M=3) is designated "5/8" because this signal causes activity to be disabled in 5 cycles of the 8-cycle clock window, and the sequence signal 1304(8) (e.g., M=8), is designated "0/8" because this signal does not disable activity in any of the 8 cycles in the clock window.

In the cycle window W0, in response to the enable signal EN being activated in cycle 1 of the clock signal CLK, the sequence signals indicated by 1/8 through 7/8 change from an enable state to a disable state (indicated by a transition from "0" to "1") to disable activity in the processing segment circuits 1104(1)-1104(X) while the sequence signal 0/8 remains in the enable state. In each subsequent cycle, one of the sequence signals 1/8 through 7/8 transitions back to the enable state before the cycle window W0 ends. Since the enable signal EN continues to be active in cycle window W1, the sequence signals 0/8 through 7/8 are repeated until the enable signal EN is deactivated in cycle window W2.

Figure 15:
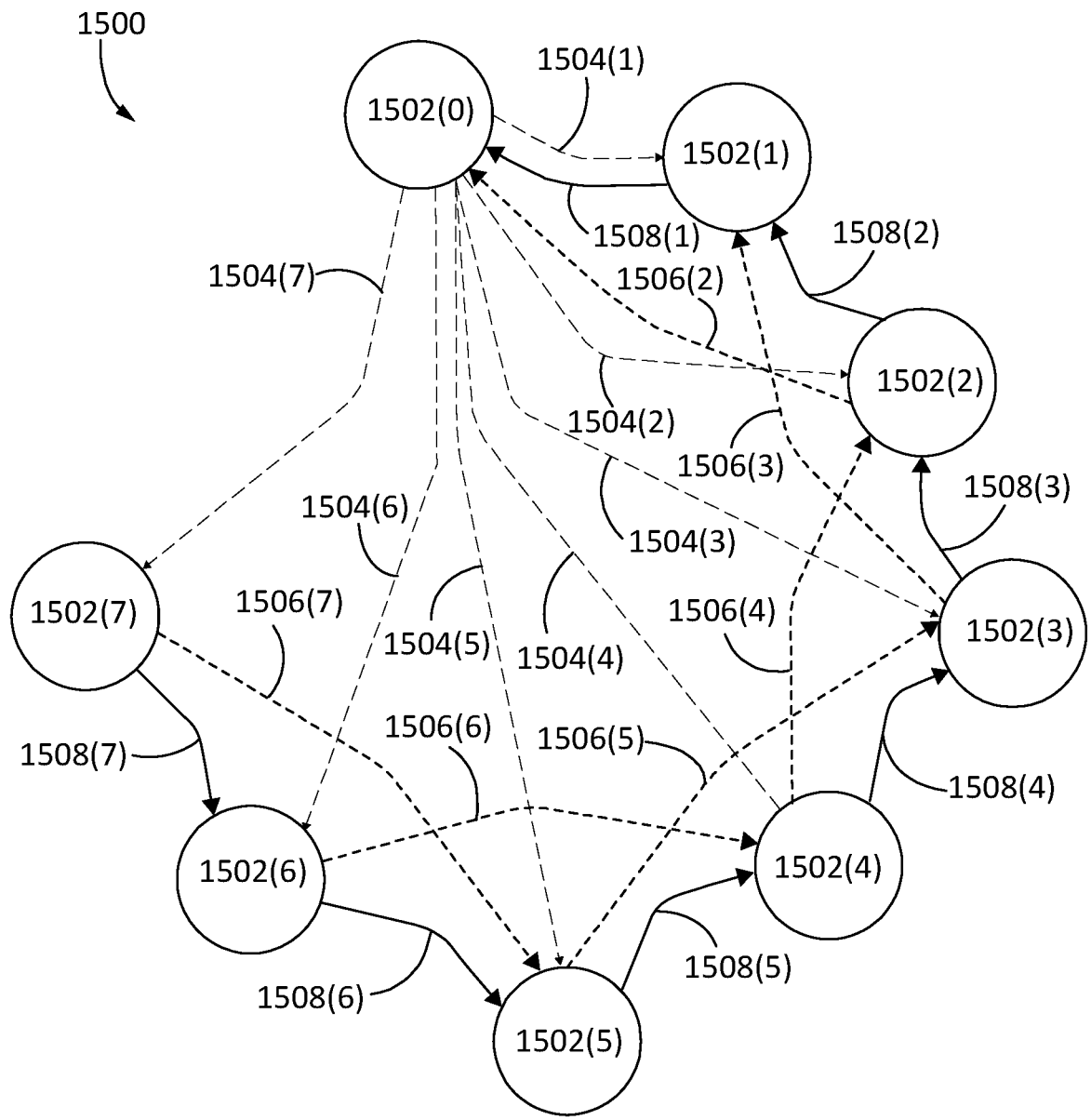
FIG. 15 is a state diagram illustrating the states of finite state machines (FSMs) in the throttle administration circuits and provided to illustrate state transitions in the FSMs in response to increases and decreases of the throttle control value.

FIG. 15 is a state diagram 1500 including states 1502(0)-1502(7) of the throttle administration circuits 1202(1)-1202(X) and is provided to illustrate examples of state transitions of the throttle administration circuits 1202(1)-1202(X), which occur in response to changes of the throttle control signal 1204 in FIG. 12 and also depend on the configuration information 1212 described above. Each FSM 1202 may have a number of states 1502(0)-1502(7) equal to the number N of consecutive cycles in a clock window of the clock signal CLK.

Any of the throttle administration circuits 1202(1)-1202(X) being in the states 1502(0) to 1502(7) cause the corresponding sequence signals 0/8 to 7/8, respectively, to be selected by the multiplexors 1306(1)-1306(X). Generally, increases in the control value 1209 will result in upward transitions to more restrictive throttling of the processing segment circuits 1104(1)-1104(X). In this example, an upward transition refers to transitioning to a higher-numbered state, where state 1502(7) is the highest-numbered state and state 1502(0) is the lowest. Since it is preferable to respond quickly to increases in throttling to avoid or reduce power-related problems, upward transitions may occur from any one of the states 1502(1)-1502(6) to any higher numbered state (e.g., states 1502(2)-1502(7)). For example, FIG. 15 illustrates any of upward transitions 1504(1)-1504(7) may occur directly from the least restrictive state 1502(0) to any of the more restrictive states 1502(1)-1502(7), depending on the throttle control signal 1204 and the configuration information 1212 in FIG. 12. In other words, the FSM 1202 can transition directly from no throttling (0/8 in FIG. 14) to any of the throttling states 1502(1)-1502(7) that select sequence signals 1/8 to 7/8. Here, the term "transition directly" indicates that a transition may occur in a next clock cycle. Although not shown in FIG. 15, to reduce drawing congestion, upward direct transitions may also occur in the FSM 1202 from any one of the states 1502(1)-1502(6) to any higher numbered state (e.g., states 1502(2)-1502(7)).

The FSM 1202 may remain in the least restrictive state 1502(0), for any number of cycles until the throttle control signal 1204 increases, causing a transition to one of the more restrictive states 1502(1)-1502(7). Since the throttling function is implemented by the sequence signals 0/8 to 7/8, the FSM 1202 remains in any of the states 1502(1)-1502(7) for at least a full clock window (e.g., 8 cycles corresponding to clock windows W0 and W1 in FIG. 14) if the throttle control signal 1204 remains the same or reduces. If there is an increase in the throttle control signal 1204, the clock window may be interrupted at any cycle by a transition to a more restrictive state.

The state diagram 1500 also includes downward transitions 1506(2)-1506(7) and downward transitions 1508(1)-1508(7), which are examples of transitions that may occur in response to decreases in the throttle control value 1209. Downward transitions 1506(2)-1506(7) and downward transitions 1508(1)-1508(7) are transitions to lower states in the FSM 1202, which correspond to less restriction on activity in the processing segment circuits 1104(1)-1104(X), and thus higher power consumption. For this reason, sudden significant increases in activity are avoided. In this regard, at the end of a clock window, if the throttle control signal 1204 has decreased (and assuming the configuration information 1212 is not conflicting with a reduction in throttling), the FSM 1202 will transition to a lower state where more activity is allowed in the processing segment circuits 1104(1)-1104(X). However, to avoid sudden surges in current due to the increased activity, the FSM 1202 may limit the downward transition to a state that is, for example, only one state or two states lower than a current state.

Referring back to FIG. 15, it can be seen that the downward transitions 1506(2)-1506(7) are transitions of two (2) states, such as from state 1502(2) to state 1502(0) or from state 1502(7) to state 1502(5), which are allowed if the throttle control signal 1204 drops two levels or more. Alternatively, the FSMs 1202 may implement downward transitions 1508(1)-1508(7), which indicate a transition from any state to a next lower state. In this example, a downward transition 1508(1) is a transition from state 1502(1) to state 1502(0) and downward transition 1508(7) is from state 1502(7) to state 1502(6). In other words, in response to an increase of the throttle control signal 1204 from a first throttle control value 1209 in a first cycle to a second throttle control value 1209 in a next cycle, each of the plurality of throttle administration circuits 1202(1)-1202(X) is configured to transition (upward) from a first one of the states 1502(0)-1502(6) corresponding to the first throttle control value 1209 to one of the states 1502(1)-1502(7) corresponding to the second throttle control value 1209, independent of a difference between the first one of the throttle control values 1209 and the second one of the throttle control values 1209.

The FSM 1202 may be configured to implement either downward transitions 1506(2)-1506(7) or downward transitions 1508(1)-1508(7) but is not limited to only these options. The FSMs 1202 may be able to select a transition limit indicating that the FSM 1202 can transition in the downward direction by a limited number of states in one transition. The transition limit may be regarded as a maximum number of states changed in a transition from one cycle to a next cycle or a maximum decrease in a corresponding one of the throttle select values 1207(1)-1207(X) from one cycle to a next cycle. The transition limit may be a configurable value stored in the configuration register 1214. For example, the FSM 1202 may be configured to transition three (3) states downward (e.g., from state 1502(7) to 1502(4)) if the throttle control signal 1204 decreases by three levels or more (e.g., from a 7/8 value to a 4/8 value or lower). As noted above, the FSM 1202 stays in each state for at least 8 cycles as the throttle control value 1209 decreases (during which the corresponding processing segment circuit 1104(1)-1104(X) receives the sequence signal, but may increase to a higher state in any cycle in response to an increase in the throttle control value 1209.

With further regard to the transition limit in the FSMs 1202, a transition from a state 1502(0)-1502(6) having a lower number to one of the states 1502(2)-1502(7) having a higher number is referred to herein as an upward transition and corresponds to an increase in the throttle control values 1209 generated by each of the FSMs 1202. Whereas a transition from a state 1502(1)-1502(7) having a higher number to one of the states 1502(0)-1502(6) having a lower number is referred to herein as a downward transition and corresponds to a decrease in the throttle control value 1209 generated by each of the FSMs 1202. In this regard, each of the plurality of FSMs 1202 is configured to increase, from one cycle to a next cycle, a first corresponding one of the throttle select values 1207(1)-1207(X) of the throttle select signal 1208(1)-1208(X) to any second corresponding second throttle select value 1207(1)-1207(X) in response to a corresponding increase in the throttle control value 1209. Each of the FSMs 1202 is configured to decrease, from one cycle to a next cycle, the throttle select signal 1204 from a first corresponding one of the throttle select values 1207(1)-1207(X) to a second corresponding one of the throttle select values 1207(1)-1207(X) by no more than the transition limit. In response to the throttle control value 1209 staying the same or decreasing, the FSMs 1202 are configured to provide a same throttle select value for the first number N of consecutive clock cycles in the clock window.

Figure 16:
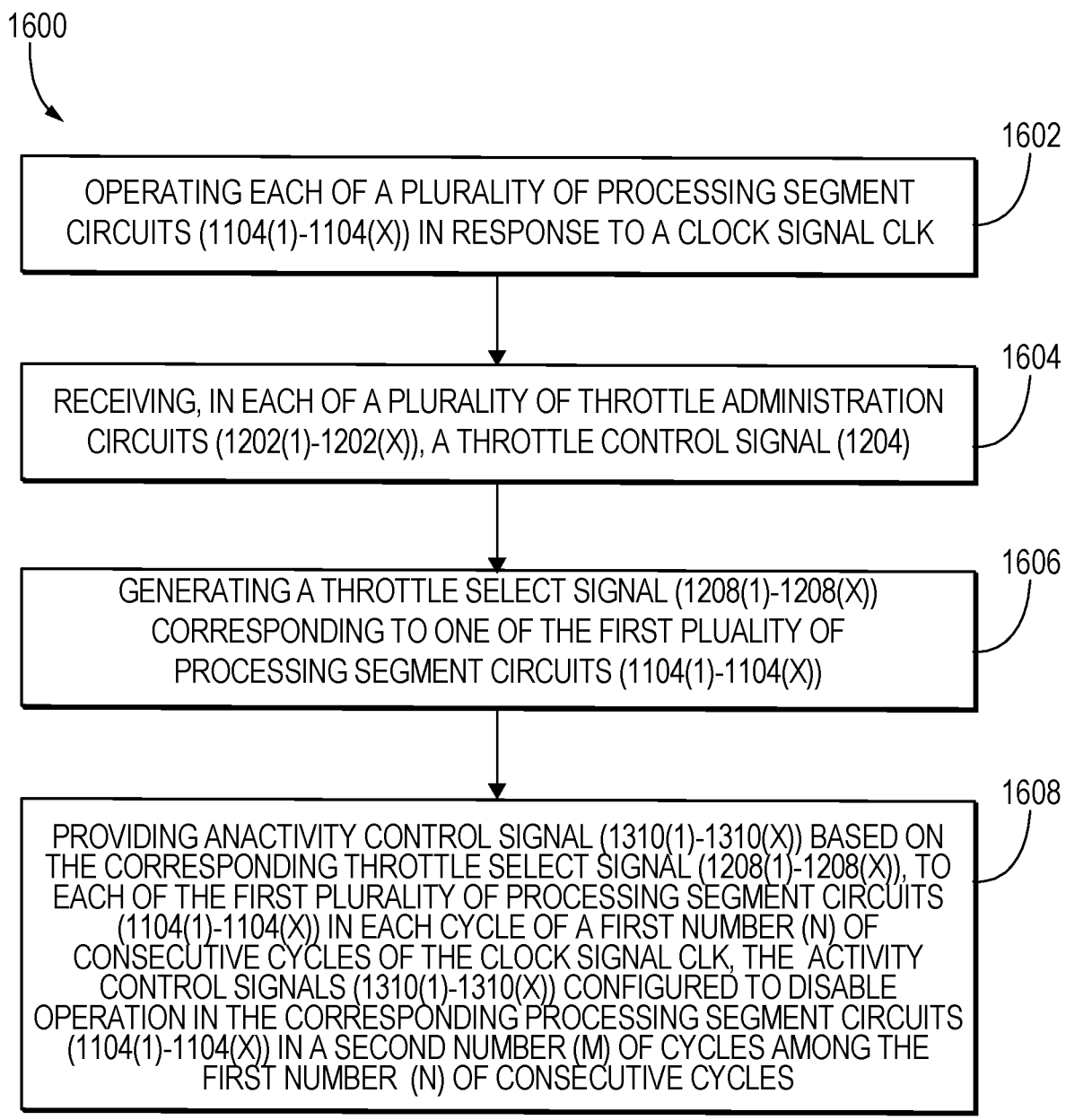
FIG. 16 is a flowchart illustrating an exemplary process for receiving throttle request(s) and generating selected activity control signals to throttle activity in processing segment circuits, including but not limited to the throttle control circuit in FIGS. 11-13 and 15.

FIG. 16 is a flowchart illustrating an exemplary process 1600 for controlling activity in an integrated circuit (IC) chip comprising a processor-based system. The method comprises operating each of a plurality of processing segment circuits 1104(1)-1104(X) in response to a clock signal CLK (block 1602) and receiving, in each of a plurality of throttle administration circuits 1202(1)-1202(X), a throttle control signal 1204 (block 1604). The method further includes generating a throttle select signal 1208(1)-1208(X) corresponding to one of the first plurality of processing segment circuits 1104(1)-1104(X) (block 1606) and providing an activity control signal 1310(1)-1310(X), based on the corresponding throttle select signal 1208(1)-1208(X), to each of the first plurality of processing segment circuits 1104(1)-1104(X) in each cycle of a first number (N) of consecutive cycles of the clock signal CLK, the activity control signals 1310(1)-1310(X) configured to disable operation in the corresponding processing segment circuits 1104(1)-1104(X) in a second number (M) of cycles among the first number (N) of consecutive cycles (block 1608).

A throttle control circuit configured to receive a throttle control signal and provide, to a plurality of processing segment circuits, selected activity control signals to control activity in a clock window of N consecutive clock cycles, including throttling activity in a number M of the N consecutive cycles based on the throttle control signal and components thereof illustrated in FIGS. 11-13 and 15, and according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 17:
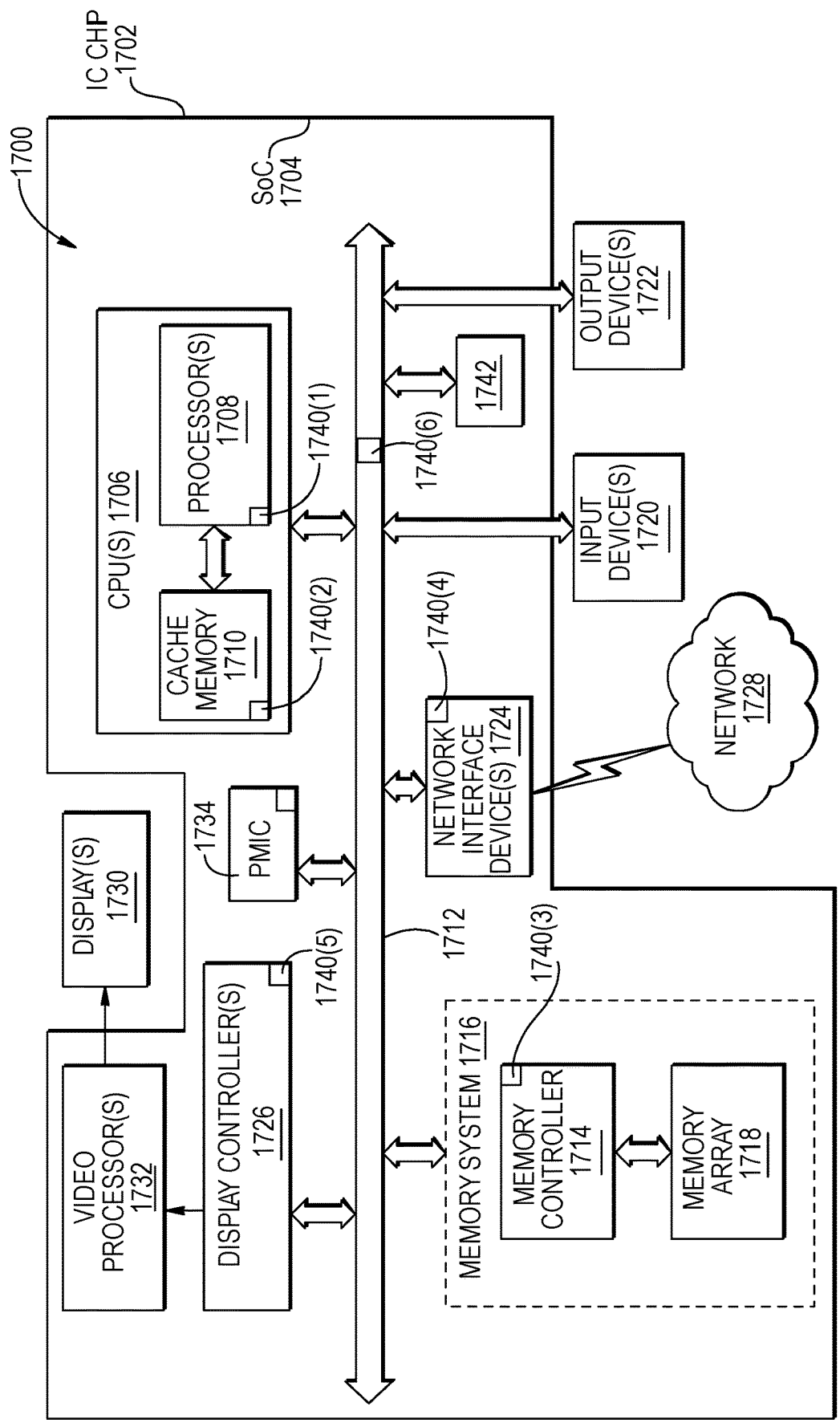
FIG. 17 is a block diagram of another exemplary processor-based system that includes the throttle control circuit configured to receive a throttle control signal for controlling power in a plurality of processing segment circuits in an IC chip and providing, to each of the plurality of processing segment circuits, a selected activity control signal configured to disable state change activity in the processing segment circuit in one number (M) of cycles among another number (N) of consecutive cycles of a clock signal CLK, including but not limited to the throttle control circuit in FIGS. 11-13 and 15.

FIG. 17 is a block diagram of another exemplary processor-based system that includes a throttle control circuit in a processor-based system on an IC chip configured to receive a throttle control signal and provide, to a plurality of processing segment circuits, selected activity control signals to control activity in a clock window of N consecutive clock cycles, including disabling activity in a number M of the N consecutive cycles based on the throttle control signal.

In this example, the processor-based system 1700 may be formed in an IC chip 1702 and as a system-on-a-chip (SoC) 1704. The processor-based system 1700 includes a central processing unit (CPU)(s) 1706 that includes one or more processors 1708, which may also be referred to as CPU cores or processor cores. The CPU 1706 may have cache memory 1710 coupled to the CPU 1706 for rapid access to temporarily stored data. The CPU 1706 is coupled to a system bus 1712 and can intercouple master and slave devices included in the processor-based system 1700. As is well known, the CPU 1706 communicates with these other devices by exchanging address, control, and data information over the system bus 1712. For example, the CPU 1706 can communicate bus transaction requests to a memory controller 1714, as an example of a slave device. Although not illustrated in FIG. 17, multiple system buses 1712 could be provided, wherein each system bus 1712 constitutes a different fabric.

Other master and slave devices can be connected to the system bus 1712. As illustrated in FIG. 17, these devices can include a memory system 1716 that includes the memory controller 1714 and a memory array(s) 1718, one or more input devices 1720, one or more output devices 1722, one or more network interface devices 1724, and one or more display controllers 1726, as examples. The input device(s) 1720 can include any type of input device, including, but not limited to, input keys, switches, voice processors, etc. The output device(s) 1722 can include any type of output device, including, but not limited to, audio, video, other visual indicators, etc. The network interface device(s) 1724 can be any device configured to allow an exchange of data to and from a network 1728. The network 1728 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1724 can be configured to support any type of communications protocol desired.

The CPU 1706 may also be configured to access the display controller(s) 1726 over the system bus 1712 to control information sent to one or more displays 1730. The display controller(s) 1726 sends information to the display(s) 1730 to be displayed via one or more video processor(s) 1732, which processes the information to be displayed into a format suitable for the display(s) 1730. The display(s) 1730 can include any type of display, including, but not limited to, a cathode ray tube (CRT), a liquid crystal display (LCD), a plasma display, a light emitting diode (LED) display, etc.

The IC chip 1702 also includes a throttle control circuit in a processor-based system on an IC chip configured to receive a throttle control signal and provide, to a plurality of processing segment circuits, selected activity control signals to control activity in a clock window of N consecutive clock cycles, including disabling activity in a number M of the N consecutive cycles based on the throttle control signal, including but not limited to the throttle control circuit and components thereof illustrated in FIGS. 11-13 and 15. The processor-based system may include a PMIC 1734 corresponding to the PMIC chip 125 in FIG. 1. The processor-based system may include a temperature sensor 1742 corresponding to the temperature sensor 132 in FIG. 1. The processor-based system 1700 can include one or more LAM circuits 1740(1)-1740(6) that are associated with one or more of the processors 1708, the cache memory 1710, the memory controller 1714, the network interface device(s) 1724, the display controller 1726, and/or the system bus 1712 that are configured to monitor activity associated with these processing devices and reporting activity power events regarding activity of these devices within the hierarchical power management system 1700. The LAM circuits 1740(1)-1740(6) may be the LAM circuits 136, 136R in the hierarchical power management systems 124, 624, 724 in FIGS. 1-3, 5-7, and 10A as examples.

Figure 18:
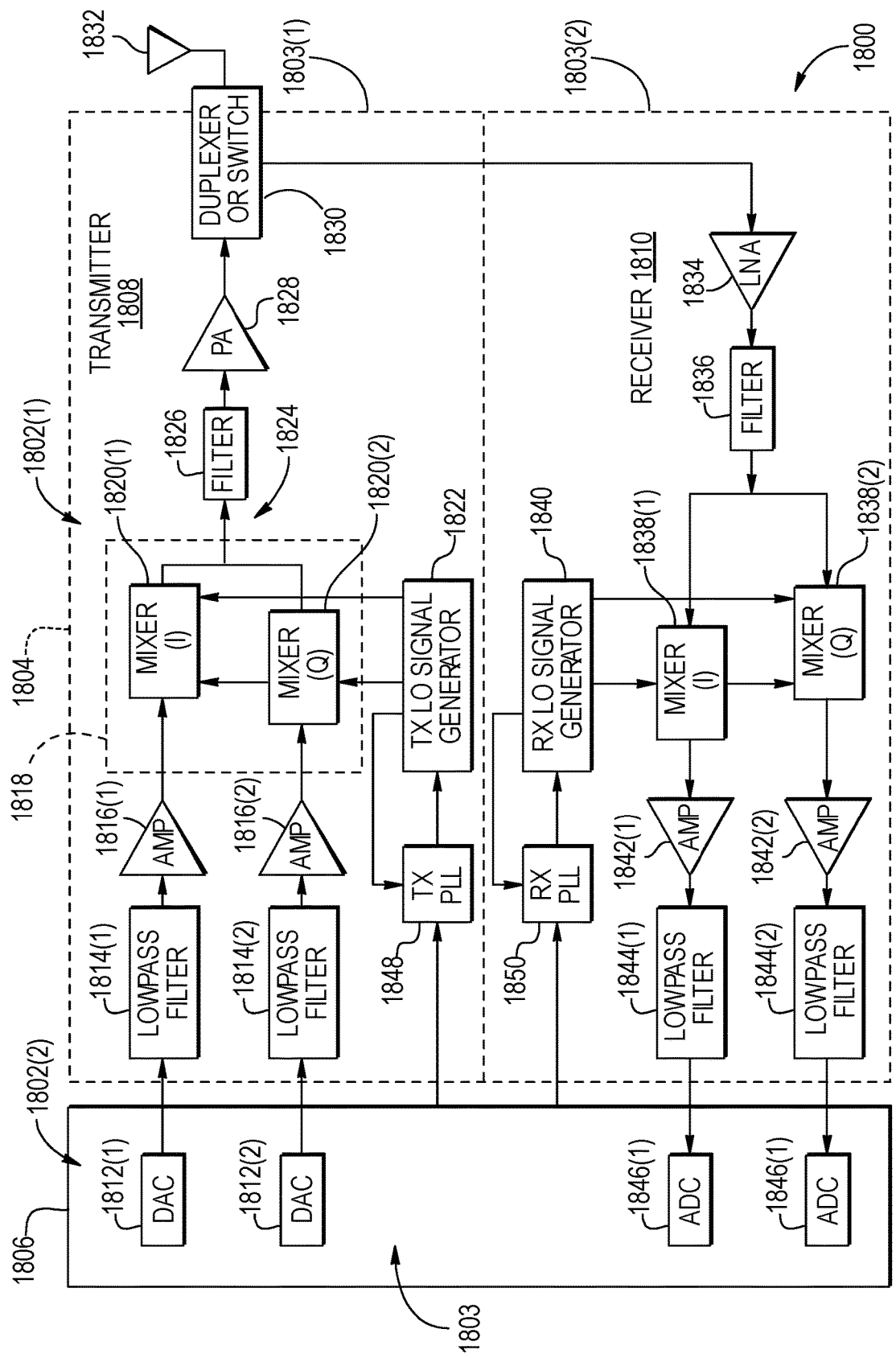
FIG. 18 is a block diagram of an exemplary wireless communication device that includes radio-frequency (RF) components that can include the throttle control circuit configured to receive a throttle control signal for controlling power in a plurality of processing segment circuits in an IC chip and providing, to each of the plurality of processing segment circuits, a selected activity control signal configured to disable state change activity in the processing segment circuit in one number (M) of cycles among another number (N) of consecutive cycles of a clock signal CLK, including but not limited to the throttle management circuit in FIGS. 11-13 and 15.

FIG. 18 illustrates an exemplary wireless communications device 1800 that can include a throttle control circuit in a processor-based system on an IC chip configured to receive a throttle control signal and provide, to a plurality of processing segment circuits, selected activity control signals to control activity in a clock window of N consecutive clock cycles, including disabling activity in a number M of the N consecutive cycles based on the throttle control signal, including but not limited to the throttle control circuit and components thereof illustrated in FIGS. 11-13 and 15.

As shown in FIG. 18, the wireless communications device 1800 includes an RF transceiver 1804 and a data processor 1806. The RF transceiver 1804 and/or the data processor 1806 can include respective hierarchical power management systems 1802(1), 1802(2) configured to locally monitor activity of devices in the processor-based system to locally estimate and throttle its power consumption and report activity power events regarding estimated power consumption to a centralized PEL circuit configured to collect activity power events regarding power consumption of the monitored processing devices and throttle power in the IC chip in response, including but not limited to the hierarchical power management systems 184, 624, 724 and their exemplary components in FIGS. 1-3, 5-7, and 9A-10.

The components of the RF transceiver 1804 and/or data processor 1806 can be split among multiple different die 1803(1), 1803(2). The data processor 1806 may include a memory to store data and program codes. The RF transceiver 1804 includes a transmitter 1808 and a receiver 1810 that support bi-directional communications. In general, the wireless communications device 1800 may include any number of transmitters 1808 and/or receivers 1810 for any number of communication systems and frequency bands. All or a portion of the RF transceiver 1804 may be implemented on one or more analog ICs, RF ICs, mixed-signal ICs, etc.

The transmitter 1808 or the receiver 1810 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage and then from IF to baseband in another stage for the receiver 1810. In the direct-conversion architecture, a signal is frequency-converted between RF and baseband in one stage. The super-heterodyne and direct-conversion architectures may use different circuit blocks and/or have different requirements. In the wireless communications device 1800 in FIG. 18, the transmitter 1808 and the receiver 1810 are implemented with the direct-conversion architecture.

In the transmit path, the data processor 1806 processes data to be transmitted and provides I and Q analog output signals to the transmitter 1808. In the exemplary wireless communications device 1800, the data processor 1806 includes digital-to-analog converters (DACs) 1812(1), 1812(2) for converting digital signals generated by the data processor 1806 into the I and Q analog output signals, e.g., I and Q output currents, for further processing.

Within the transmitter 1808, lowpass filters 1814(1), 1814(2) filter the I and Q analog output signals, respectively, to remove undesired signals caused by the prior digital-to-analog conversion. Amplifiers (AMPs) 1816(1), 1816(2) amplify the signals from the lowpass filters 1814(1), 1814(2), respectively, and provide I and Q baseband signals. An upconverter 1818 upconverts the I and Q baseband signals with I and Q transmit (TX) local oscillator (LO) signals through mixers 1820(1), 1820(2) from a TX LO signal generator 1822 to provide an upconverted signal 1824. A filter 1826 filters the upconverted signal 1824 to remove undesired signals caused by the frequency upconversion as well as noise in a receive frequency band. A power amplifier (PA) 1828 amplifies the upconverted signal 1824 from the filter 1826 to obtain the desired output power level and provides a transmit RF signal. The transmit RF signal is routed through a duplexer or switch 1830 and transmitted via an antenna 1832.

In the receive path, the antenna 1832 receives signals transmitted by base stations and provides a received RF signal, which is routed through the duplexer or switch 1830 and provided to a low noise amplifier (LNA) 1834. The duplexer or switch 1830 is designed to operate with a specific receive (RX)-to-TX duplexer frequency separation, such that RX signals are isolated from TX signals. The received RF signal is amplified by the LNA 1834 and filtered by a filter 1836 to obtain a desired RF input signal. Downconversion mixers 1838(1), 1838(2) mix the output of the filter 1836 with I and Q RX LO signals (i.e., LO_I and LO_Q) from an RX LO signal generator 1840 to generate I and Q baseband signals. The I and Q baseband signals are amplified by AMPs 1842(1), 1842(2) and further filtered by lowpass filters 1844(1), 1844(2) to obtain I and Q analog input signals, which are provided to the data processor 1806. In this example, the data processor 1806 includes analog-to-digital converters (ADCs) 1846(1), 1846(2) for converting the analog input signals into digital signals to be further processed by the data processor 1806.

In the wireless communications device 1800 of FIG. 18, the TX LO signal generator 1822 generates the I and Q TX LO signals used for frequency upconversion, while the RX LO signal generator 1840 generates the I and Q RX LO signals used for frequency downconversion. Each LO signal is a periodic signal with a particular fundamental frequency. A TX phase-locked loop (PLL) circuit 1848 receives timing information from the data processor 1806 and generates a control signal used to adjust the frequency and/or phase of the TX LO signals from the TX LO signal generator 1822. Similarly, an RX PLL circuit 1850 receives timing information from the data processor 1806 and generates a control signal used to adjust the frequency and/or phase of the RX LO signals from the RX LO signal generator 1840.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. Alternatively, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) chip comprising a processor-based system, the processor-based system comprising:
    a plurality of processing segment circuits, each configured to operate in response to a clock signal; and
    a throttle control circuit comprising:
        a plurality of throttle administration circuits, each configured to receive a throttle control signal and generate a throttle select signal based on the throttle control signal, corresponding one of the first plurality of processing segment circuits; and
        a throttle sequence selection circuit configured to provide, to each of the first plurality of processing segment circuits, an activity control signal configured to throttle activity in the processing segment circuit in a first number (M) of cycles among a second number (N) of consecutive cycles of the clock signal based on a corresponding throttle select signal.
2. The IC chip of clause 1, each of the first plurality of processing segment circuits comprising at least one transistor circuit configured to change an output voltage state in response to the clock signal.
3. The IC chip of clause 1 or 2, each of the first plurality of processing segment circuits coupled to a same power rail to receive a power supply voltage.
4. The IC chip of any of clauses 1-3, each of the first plurality of processing segment circuits located adjacent to another one of the first plurality of processing segment circuits.
5. The IC chip of any of clauses 1-4, wherein:
    the throttle control signal indicates one of a third number (L) of throttle control values; and
    the third number (L) of throttle control values is equal to the first number (N) of consecutive clock cycles of the clock signal.
6. The IC chip of any of clauses 1-5, wherein the throttle select signal corresponding to one of the plurality of processing segment circuits is generated in one of the plurality of throttle administration circuits based on the throttle control signal and on configuration information corresponding to the processing segment circuit.
7. The IC chip of any of clauses 1-6, further comprising a configuration register configured to store, for each one of the plurality of processing segment circuits, configuration information corresponding to each of the throttle control values, wherein the throttle administration circuit is configured to, for a given throttle control value, determine the number M of cycles among the first number N of cycles, that activity in a corresponding one of the processing segment circuits is disabled based on the configuration information.
8. The IC chip of any of clauses 1-7, wherein each of the plurality of throttle administration circuits comprises a finite state machine having a fourth number (K) of states equal to the first number (N) of consecutive cycles of the clock signal.
9. The IC chip of clause 8, wherein:
    each of the plurality of throttle administration circuits is configured to generate the throttle select signal having a throttle select value for each of the fourth number (K) of states; and
    an increase of the throttle select value corresponds to an increase of the second number (M) of cycles in which activity in the processing segment circuit is disabled among the first number (N) of consecutive cycles.
10. The IC chip of clause 9, wherein each of the plurality of throttle administration circuits is configured to increase, from one cycle to a next cycle, the throttle select value of the throttle select signal from a first throttle select value to any second throttle select value higher than the first throttle select value in response to a corresponding increase in the throttle control value.
11. The IC chip of clause 9 or 10, wherein each of the plurality of throttle administration circuits is configured to decrease, from one cycle to a next cycle, the throttle select signal from a first throttle select value to a second throttle select value that is lower than the first throttle select value by no more than a transition limit.
12. The IC chip of any of clauses 9-11 wherein, in response to the throttle control value staying the same or decreasing, each of the plurality of throttle administration circuits is configured to provide the second throttle select value for the first number (N) of consecutive cycles of the clock signal.
13. The IC chip of clause 11 or 12, wherein the transition limit is a configurable value stored in a configuration register.
14. The IC chip of any of clauses 1-13, further comprising a plurality of throttle sequence generators configured to generate sequence signals that are selected by the throttle select signals to be provided as the activity control signal, wherein plurality of throttle sequence generators are configured to generate the select signals to disable every number, from 0 to N−1, of the cycles of the number N of consecutive cycles.
15. The IC chip of any of clauses 1-14, wherein in response to the throttle control signal having a highest throttle control value, the throttle sequence selection circuit is configured to provide the activity control signal to disable activity in all but one cycle of the first number (N) of consecutive cycles.
16. The IC chip of any of clauses 1-15, wherein in response to the throttle control signal having a lowest throttle select value, the throttle sequence selection circuit is configured to provide the activity control signal to disable activity in none of the first number (N) of consecutive cycles.
17. The IC chip of any of clauses 1-16, the throttle sequence selection circuit comprising a plurality of multiplexors, each controlled by one of the throttle select signals generated by the plurality of throttle administration circuits, wherein each of the plurality of multiplexors comprises an output coupled to one of the plurality of processing segment circuits.

18. The IC chip of any of clauses 1-17, each of the plurality of processing segment circuits comprising an activity control circuit configured to receive the activity control signal and disable activity in a plurality of transistor circuits in the processing segment circuit, wherein disabling activity comprises gating the clock signal.

19. The IC chip of any of clauses 1-18, further comprising:
   at least a second plurality of processing segment circuits; and
   at least a second throttle control circuit configured to control state changes in the at least a second plurality of processing segment circuits to manage power in response to detected power events.

20. The IC chip of any of clauses 1-19 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

21. A method of controlling activity in an integrated circuit (IC) chip comprising a processor-based system, the method comprising:
   operating each of a plurality of processing segment circuits in response to a clock signal;
   receiving, in each of a plurality of throttle administration circuits, a throttle control signal;
   generating a throttle select signal corresponding one of the first plurality of processing segment circuits; and
   providing an activity control signal, based on the corresponding throttle select signal, to each of the first plurality of processing segment circuits in each cycle of a first number (N) of consecutive cycles of the clock signal, the activity control signal configured to disable operation in the processing segment circuit in a second number (M) of cycles among the first number (N) of consecutive cycles.

22. The method of clause 21, further comprising generating the throttle select signals in each one of the plurality of throttle administration circuits based on the throttle control signal and on a configuration setting corresponding to the processing segment circuit.

23. The method of clause 21 or 22, further comprising disabling, based on configuration settings in a configuration register, a different second number (M) of state changes among the first number (N) of consecutive cycles in a first one of the plurality of processing segment circuits than in the first number (N) of consecutive cycles in a second one of the plurality of processing segment circuits.

24. The method of any of clauses 21-23, wherein an increase of the throttle select value corresponds to an increase of the second number M of cycles in which state changes in the processing segment circuit are disabled among the first number N of consecutive cycles.

25. The method of any of clauses 21-24, further comprising increasing, from a first cycle to a second cycle, the throttle select value of the throttle select signal from a first throttle select value to a second throttle select value that is higher than the first throttle control value in response to a corresponding increase in the throttle control value.

26. The method of any of clauses 21-25, further comprising reducing, from a first cycle to a second cycle, the throttle select value of the throttle select signal from a first throttle select value to a second throttle select value that is less than the first throttle select value by no more than a transition limit in response to a corresponding decrease in the throttle control value.

27. The method of clause 26, further comprising, in response to the throttle control value staying the same or decreasing, providing, in each of the plurality of throttle administration circuits, the second throttle select value for the first number (N) of consecutive cycles of the clock signal before further reducing the throttle select signal to a third throttle select value that is less than the second throttle select value by not more than the transition limit.

28. A throttle control circuit comprising:
   a plurality of throttle administration circuits, each configured to receive a throttle control signal and generate a throttle select signal based on the throttle control signal, corresponding one of a first plurality of processing segment circuits; and
   a throttle sequence selection circuit configured to provide, to each of the first plurality of processing segment circuits in each cycle of a first number (N) of consecutive cycles of the clock signal, an activity control signal configured to disable state changes in the processing segment circuit in a second number (M) of cycles among the first number of consecutive cycles based on the corresponding throttle select signal.

What is claimed is:

1. An integrated circuit (IC) chip comprising a processor-based system, the processor-based system comprising:
   a first plurality of processing segment circuits, each configured to operate in response to a clock signal; and
   a throttle control circuit comprising:
      a plurality of throttle administration circuits, each configured to receive a throttle control signal and generate a throttle select signal, based on the throttle control signal, to a corresponding one of the first plurality of processing segment circuits; and
      a throttle sequence selection circuit configured to provide, to each of the first plurality of processing segment circuits, an activity control signal configured to throttle activity in the processing segment circuit in a first number (M) of cycles among a second number (N) of consecutive cycles of the clock signal based on a corresponding throttle select signal.

2. The IC chip of claim 1, each of the first plurality of processing segment circuits comprising at least one transistor circuit configured to change an output voltage state in response to the clock signal.

3. The IC chip of claim 1, each of the first plurality of processing segment circuits coupled to a same power rail to receive a power supply voltage.

4. The IC chip of claim 1, each of the first plurality of processing segment circuits located adjacent to another one of the first plurality of processing segment circuits.

5. The IC chip of claim 1, wherein:
   the throttle control signal indicates one of a third number (L) of throttle control values; and the third number (L) of throttle control values is equal to the first second number (N) of consecutive clock cycles of the clock signal.

6. The IC chip of claim 1, wherein the throttle select signal corresponding to one of the first plurality of processing segment circuits is generated in one of the plurality of throttle administration circuits based on the throttle control signal and on configuration information corresponding to the processing segment circuit.

7. The IC chip of claim 5, further comprising a configuration register configured to store, for each one of the first plurality of processing segment circuits, configuration information corresponding to each of the third number (L) of throttle control values, wherein each throttle administration circuit of the plurality of throttle administration circuits is configured to, for a given throttle control value of the third number (L) of throttle control values, determine the first number (M) of cycles, among the second number (N) of consecutive cycles, in which activity in a corresponding one of the processing segment circuits is disabled based on the configuration information.

8. The IC chip of claim 5, wherein each of the plurality of throttle administration circuits comprises a finite state machine having a fourth number (K) of states equal to the second number (N) of consecutive cycles of the clock signal.

9. The IC chip of claim 8, wherein:
each of the plurality of throttle administration circuits is configured to generate the throttle select signal having a throttle select value for each of the fourth number (K) of states; and
an increase of the throttle select value corresponds to an increase of the first number (M) of cycles in which activity in the processing segment circuit is disabled among the second number (N) of consecutive cycles.

10. The IC chip of claim 9, wherein each of the plurality of throttle administration circuits is configured to increase, from one cycle to a next cycle, the throttle select value of the throttle select signal from a first throttle select value to a second throttle select value higher than the first throttle select value in response to a corresponding increase in the one throttle control value.

11. The IC chip of claim 9, wherein each of the plurality of throttle administration circuits is configured to decrease, from one cycle to a next cycle, the throttle select signal from a first throttle select value to a second throttle select value that is lower than the first throttle select value by no more than a transition limit.

12. The IC chip of claim 10 wherein, in response to the one throttle control value staying the same or decreasing, each of the plurality of throttle administration circuits is configured to provide the second throttle select value for the first second number (N) of consecutive cycles of the clock signal.

13. The IC chip of claim 11, wherein the transition limit is a configurable value stored in a configuration register.

14. The IC chip of claim 1, further comprising a plurality of throttle sequence generators configured to generate sequence signals that are selected by the throttle select signals to be provided as the activity control signal, wherein the plurality of throttle sequence generators is configured to generate the sequence signals having a first state for the first number (M) of cycles and having a second state for N–M cycles and the every number M ranges from 0 to N–1 among the sequence signals.

15. The IC chip of claim 5, wherein in response to the throttle control signal having a highest throttle control value of the third number (L) of throttle control values, the throttle sequence selection circuit is configured to provide the activity control signal to disable activity in all but one cycle of the second number (N) of consecutive cycles.

16. The IC chip of claim 9, wherein in response to the throttle control signal having a lowest throttle select value, the throttle sequence selection circuit is configured to provide the activity control signal to disable activity in none of the second number (N) of consecutive cycles.

17. The IC chip of claim 1, the throttle sequence selection circuit comprising a plurality of multiplexors, each controlled by one of the throttle select signals generated by the plurality of throttle administration circuits, wherein each of the plurality of multiplexors comprises an output coupled to one of the first plurality of processing segment circuits.

18. The IC chip of claim 1, each of the first plurality of processing segment circuits comprising an activity control circuit configured to receive the activity control signal and disable activity in a plurality of transistor circuits in the processing segment circuit, wherein disabling activity comprises gating the clock signal.

19. The IC chip of claim 1, further comprising:
at least a second plurality of processing segment circuits; and
at least a second throttle control circuit configured to control state changes in the at least a second plurality of processing segment circuits to manage power in response to detected power events.

20. The IC chip of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

21. A method of controlling activity in an integrated circuit (IC) chip comprising a processor-based system, the method comprising:
operating each of a first plurality of processing segment circuits in response to a clock signal;
receiving, in each of a plurality of throttle administration circuits, a throttle control signal;
generating a throttle select signal to a corresponding one of the first plurality of processing segment circuits; and
providing an activity control signal, based on the corresponding throttle select signal, to each of the first plurality of processing segment circuits in each cycle of a first second number (N) of consecutive cycles of the clock signal, the activity control signal configured to disable operation in the processing segment circuit in a first number (M) of cycles among the second number (N) of consecutive cycles.

22. The method of claim 21, further comprising generating the throttle select signals in each one of the plurality of throttle administration circuits based on the throttle control signal and on a configuration setting corresponding to the processing segment circuit.

23. The method of claim 21, further comprising disabling, based on configuration settings in a configuration register, a different first number (M) of state changes among the second number (N) of consecutive cycles in a first one of the first plurality of processing segment circuits than in a second one of the first plurality of processing segment circuits.

24. The method of claim 21, wherein an increase of a throttle select value of the throttle select signal corresponds to an increase of the first number (M) of cycles in which state changes in the processing segment circuit are disabled among the second number (N) of consecutive cycles.

25. The method of claim 24, further comprising increasing, from a first cycle to a second cycle, the throttle select value of the throttle select signal from a first throttle select value to a second throttle select value that is higher than the first throttle select value in response to a corresponding increase in a throttle control value of the throttle control signal.

26. The method of claim 24, further comprising reducing, from a first cycle to a second cycle, the throttle select value of the throttle select signal from a first throttle select value to a second throttle select value that is less than the first throttle select value by no more than a transition limit in response to a corresponding decrease in a throttle control value of the throttle control signal.

27. The method of claim 26, further comprising, in response to the throttle control value of the throttle control signal staying the same or decreasing, providing, in each of the plurality of throttle administration circuits, the second throttle select value for the first number (N) of consecutive cycles of the clock signal before further reducing the throttle select signal to a third throttle select value that is less than the second throttle select value by not more than the transition limit.

28. A throttle control circuit comprising:
 a plurality of throttle administration circuits, each configured to receive a throttle control signal and generate a throttle select signal, based on the throttle control signal, to a corresponding one of a first plurality of processing segment circuits; and
 a throttle sequence selection circuit configured to provide, to each of the first plurality of processing segment circuits in each cycle of a second number (N) of consecutive cycles of the clock signal, an activity control signal configured to disable state changes in the processing segment circuit in a first number (M) of cycles among the second number (N) of consecutive cycles based on the corresponding throttle select signal.

* * * * *